(12) United States Patent
Lee et al.

(10) Patent No.: US 11,585,707 B2
(45) Date of Patent: Feb. 21, 2023

(54) SENSING DEVICE FOR REDUCING CONTACT AMOUNT BETWEEN A STATOR AND A HOUSING TO REDUCE NOISE

(71) Applicant: LG INNOTEK CO., LTD., Seoul (KR)

(72) Inventors: Su Hyoung Lee, Seoul (KR); Ho Chan Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/972,756

(22) PCT Filed: Dec. 21, 2018

(86) PCT No.: PCT/KR2018/016430
§ 371 (c)(1),
(2) Date: Dec. 7, 2020

(87) PCT Pub. No.: WO2019/235706
PCT Pub. Date: Dec. 12, 2019

(65) Prior Publication Data
US 2021/0239550 A1     Aug. 5, 2021

(30) Foreign Application Priority Data

Jun. 8, 2018 (KR) .................... 10-2018-0066204
Nov. 15, 2018 (KR) .................... 10-2018-0140530

(51) Int. Cl.
*G01L 3/10*      (2006.01)

(52) U.S. Cl.
CPC .................................. *G01L 3/101* (2013.01)

(58) Field of Classification Search
CPC ........ G01L 3/101; H02K 1/185; H02K 1/278; H02K 1/14; H02K 1/148; H02K 1/146; H02K 7/003; H02K 7/116; B62D 6/10
USPC ........................................................ 73/862.325
See application file for complete search history.

(56) References Cited

U.S. PATENT DOCUMENTS

| | | | |
|---|---|---|---|
| 9,434,410 B2* | 9/2016 | Lee | ........... B62D 5/0457 |
| 2010/0319466 A1 | 12/2010 | Bae et al. | |
| 2012/0297916 A1 | 11/2012 | Lee | |
| 2014/0167558 A1* | 6/2014 | Woo | ........... H02K 5/24 |
| | | | 310/216.113 |
| 2016/0238471 A1* | 8/2016 | Son | ........... G01L 3/101 |

FOREIGN PATENT DOCUMENTS

| | | | |
|---|---|---|---|
| CN | 113646998 A | * | 11/2021 |
| DE | 20220383 U1 | | 7/2003 |
| EP | 2020710 A1 | | 2/2009 |
| EP | 102012024382 | * | 6/2014 |

(Continued)

*Primary Examiner* — Octavia Davis Hollington
(74) *Attorney, Agent, or Firm* — Birch, Stewart, Kolasch & Birch, LLP

(57) ABSTRACT

An embodiment relates to a sensing device comprising: a housing; a stator disposed within the housing; and a rotor disposed within the stator, wherein the stator comprises a body and a stator tooth coupled to the body, the housing comprises a first surface corresponding to a bottom surface of the stator tooth, and the first surface comprises a curved surface protruding toward the stator tooth. Accordingly, noise can be reduced by reducing the amount of contact between the stator and the housing.

20 Claims, 27 Drawing Sheets

(56) References Cited

FOREIGN PATENT DOCUMENTS

| | | | |
|---|---|---|---|
| JP | 2005-326270 A | | 11/2005 |
| KR | 10-2009-0097378 A | | 9/2009 |
| KR | 10-2011-0056143 A | | 5/2011 |
| KR | 10-2012-0062134 A | | 6/2012 |
| KR | 10-2016-0029989 A | | 3/2016 |
| KR | 10-1633127 B1 | | 6/2016 |
| KR | 20160081137 | * | 7/2016 |
| KR | 20200050765 | * | 5/2020 |

* cited by examiner

[FIG. 1]
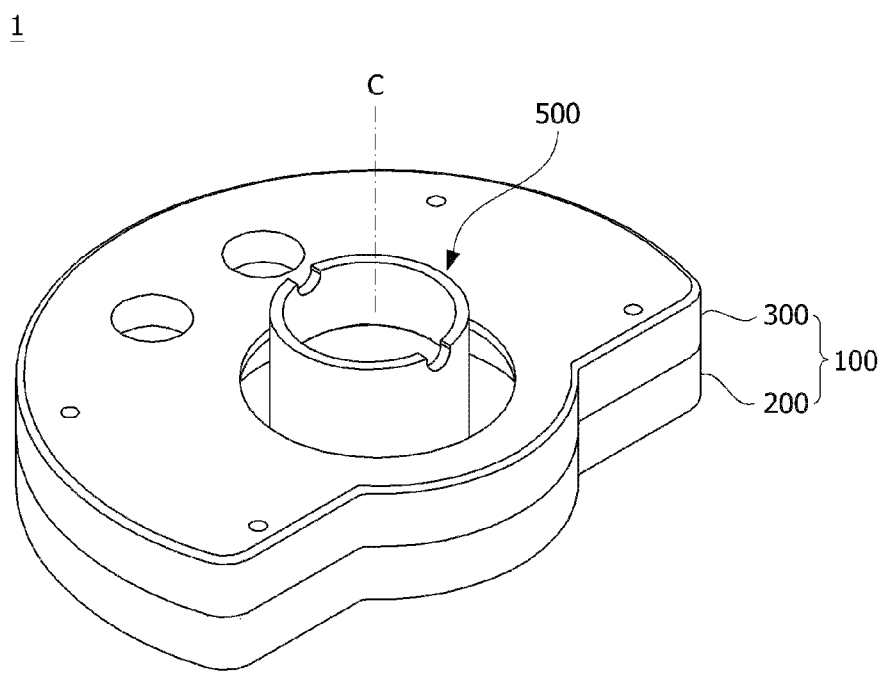

[FIG. 2]
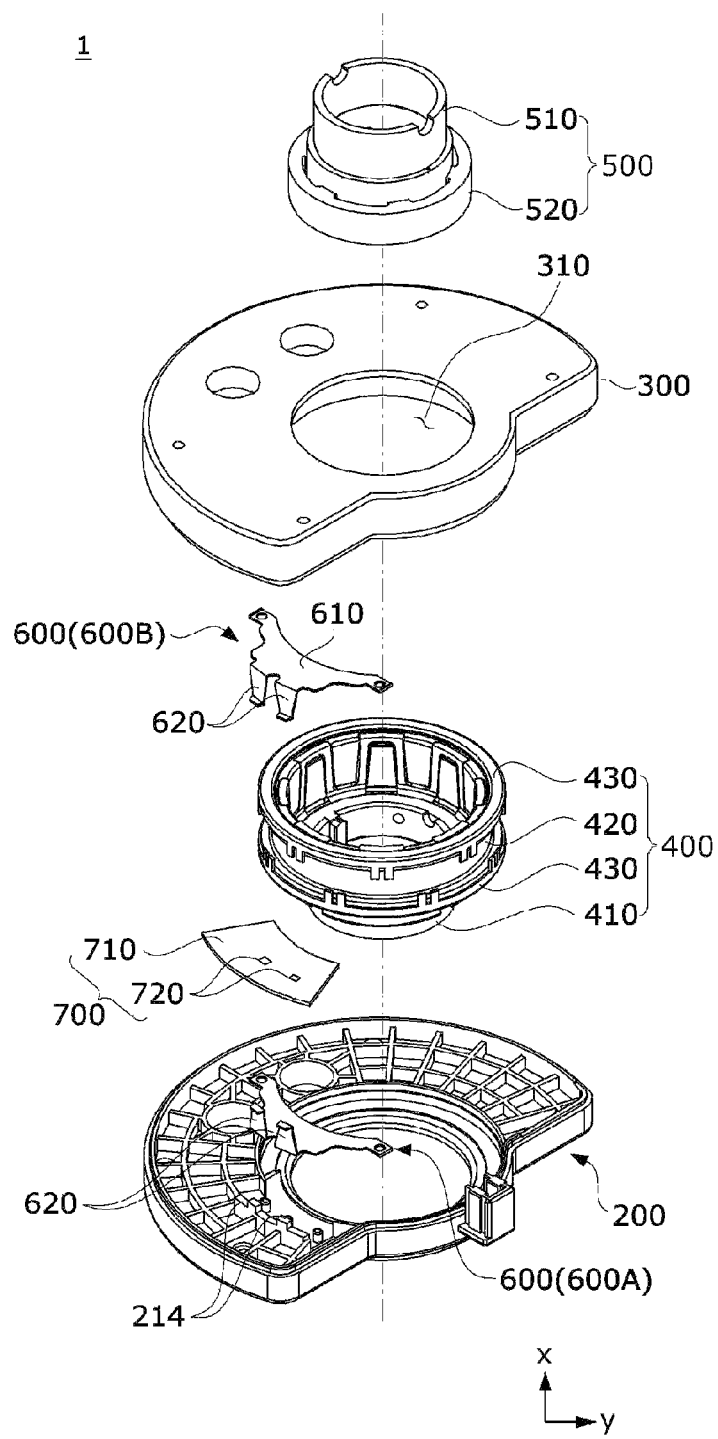

[FIG. 3]
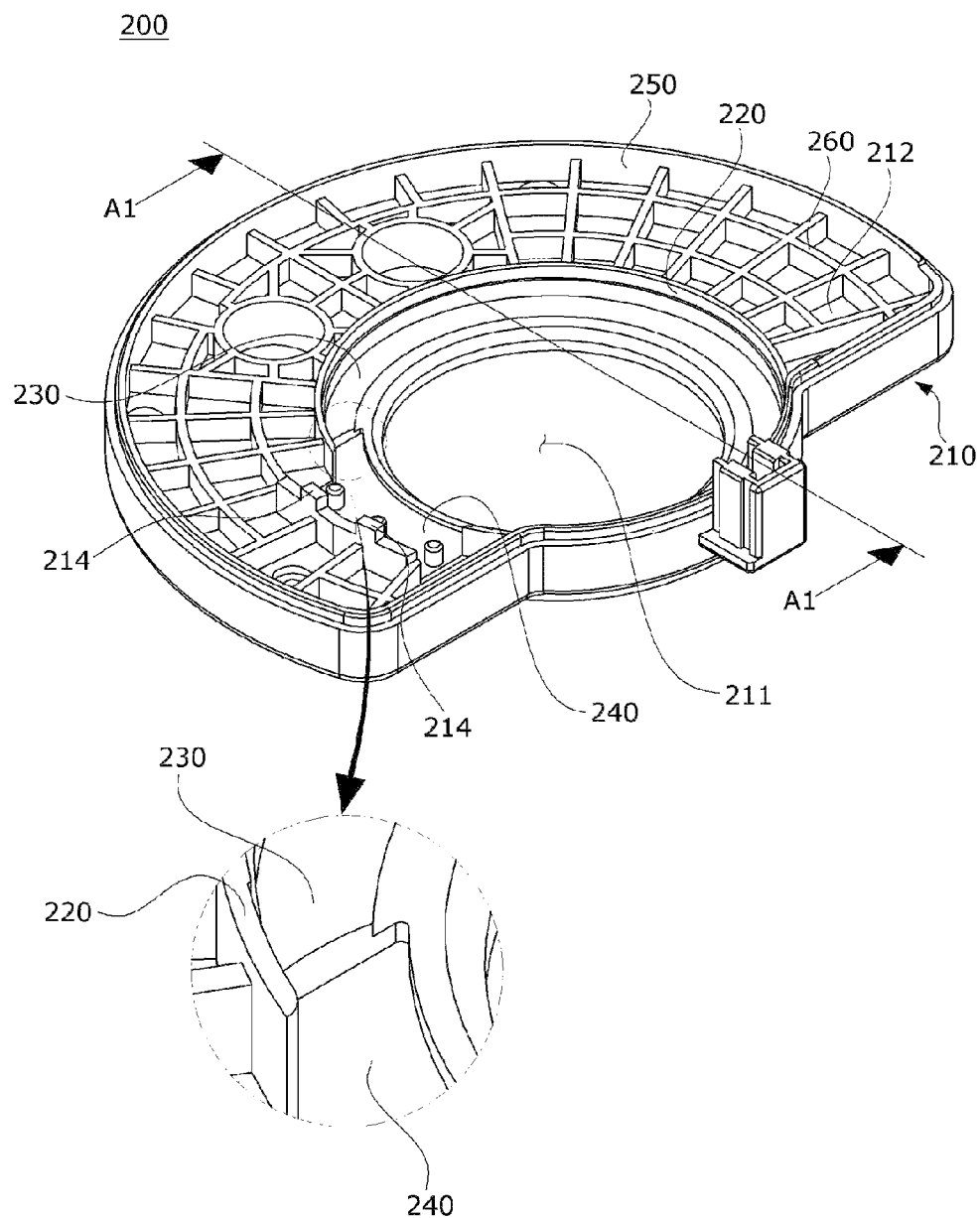

[FIG. 4]
200
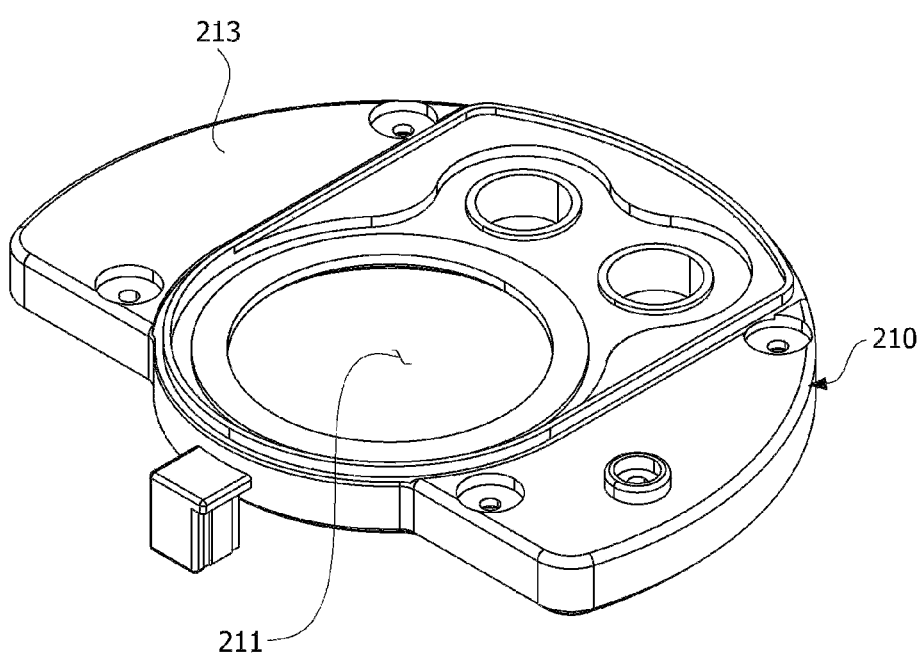

[FIG. 5]
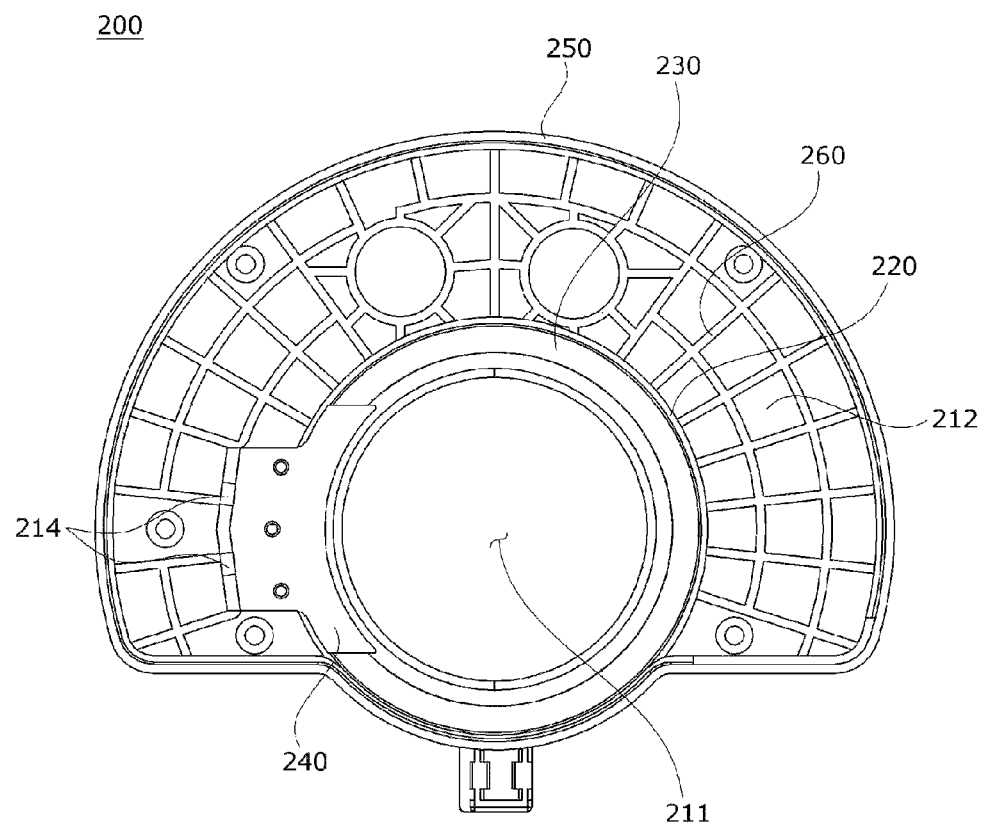

[FIG. 6]
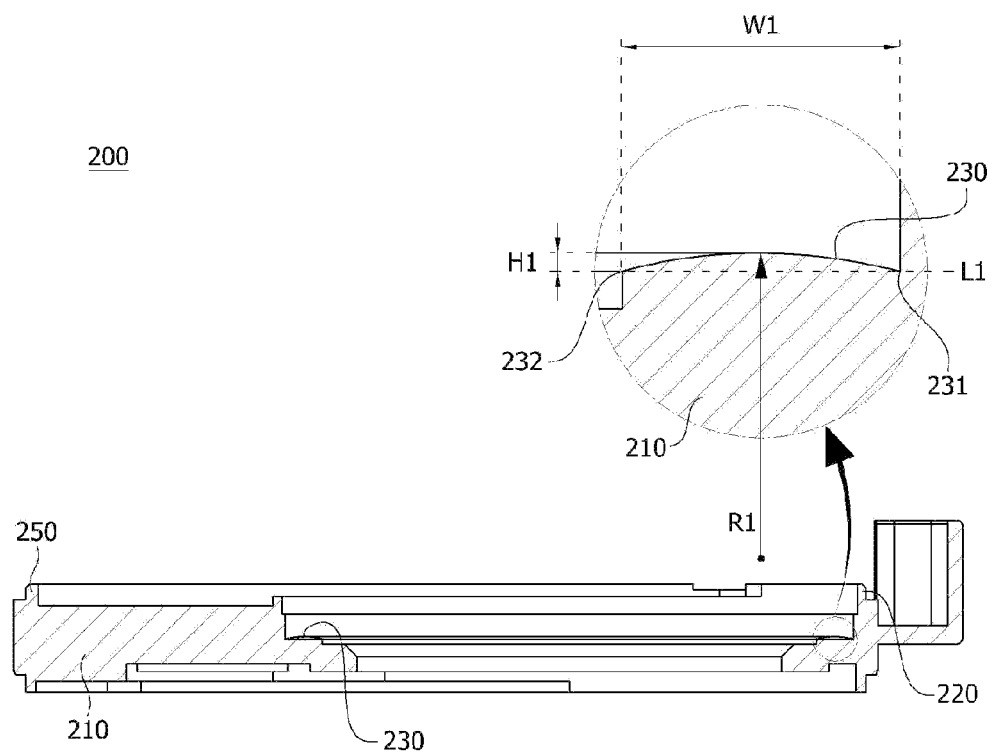

[FIG. 7]
200A
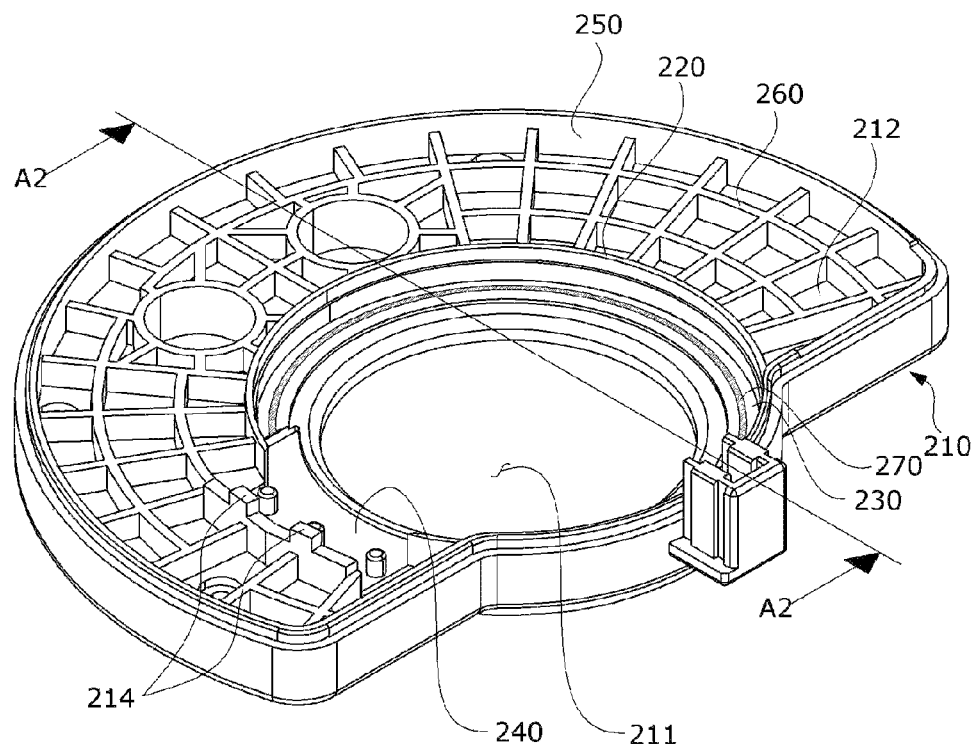

[FIG. 8]
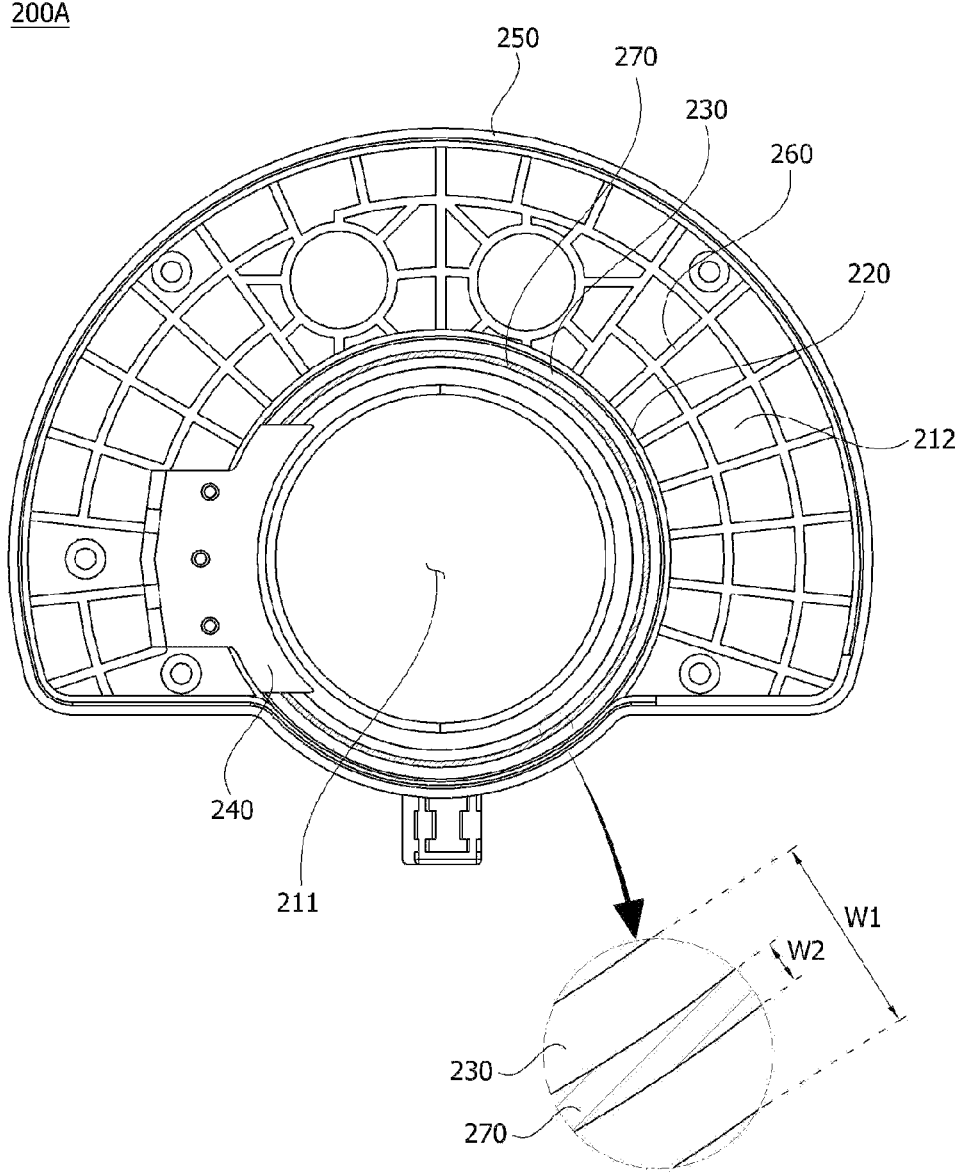

[FIG. 9]
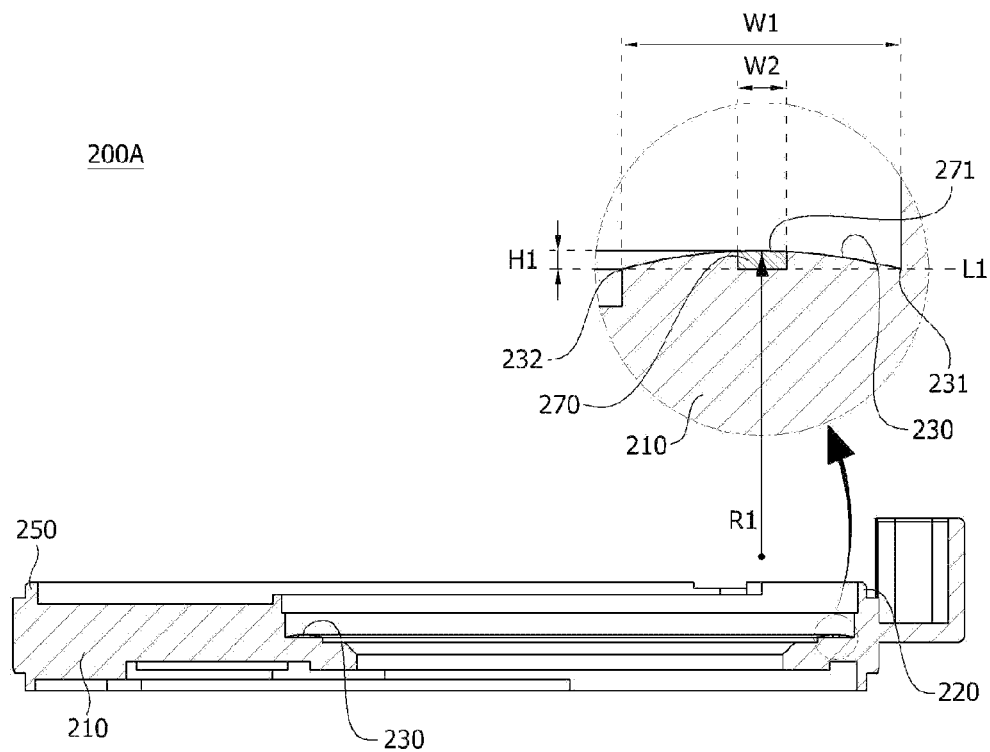

[FIG. 10]
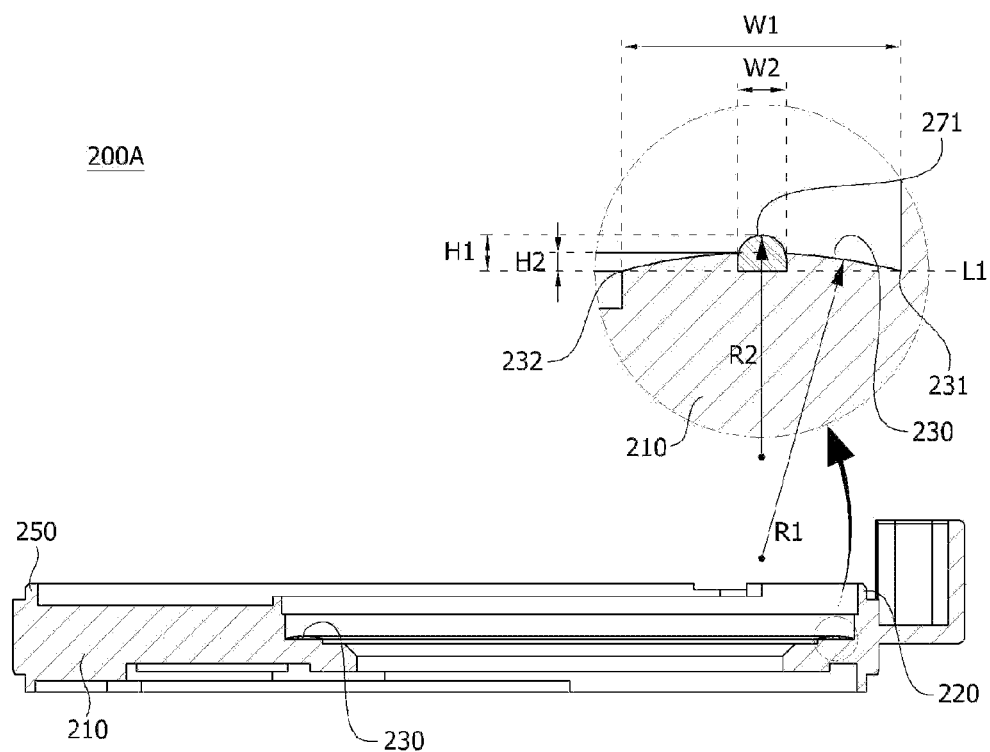

[FIG. 11]
200A
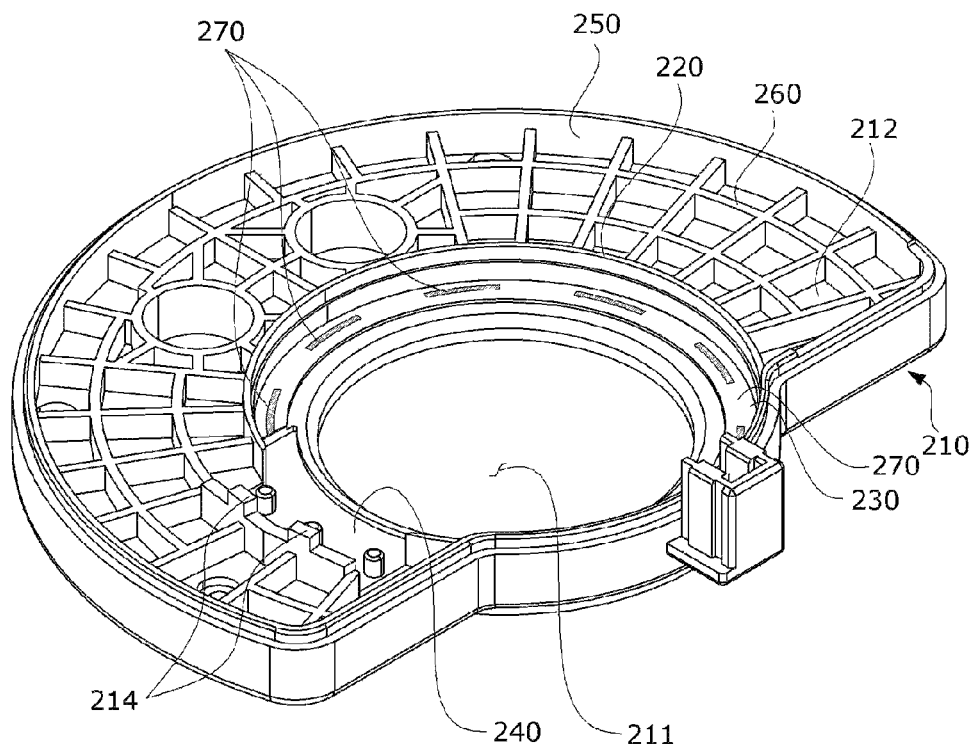

[FIG. 12]
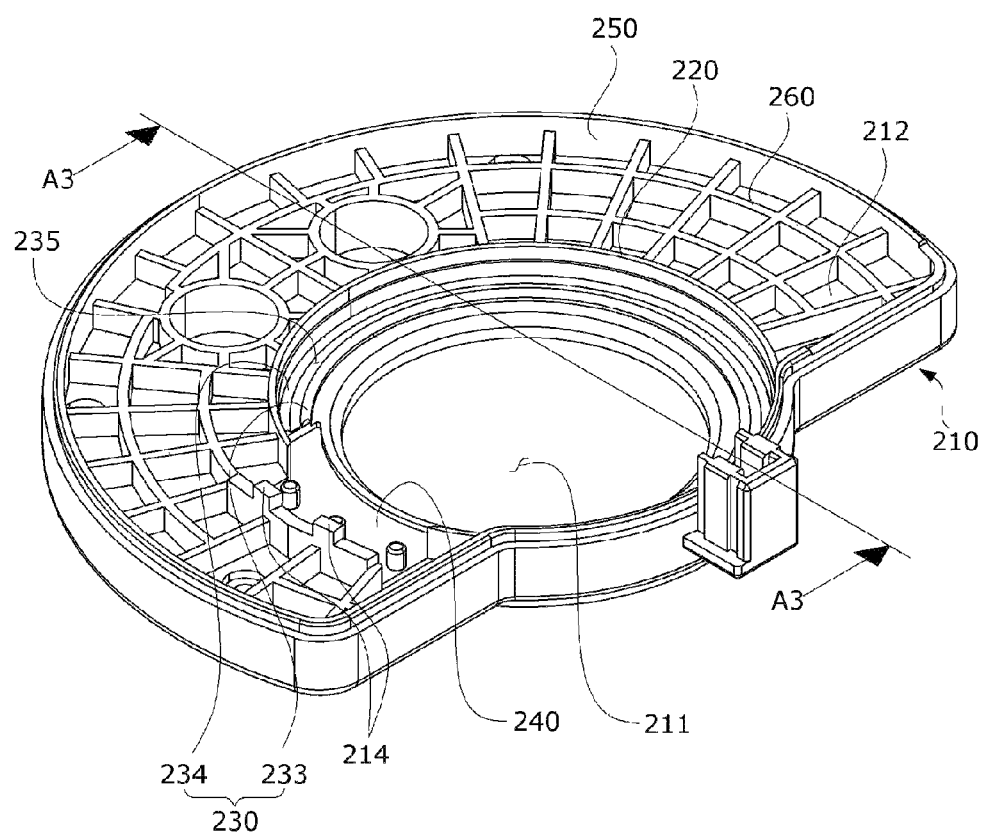

[FIG. 13]
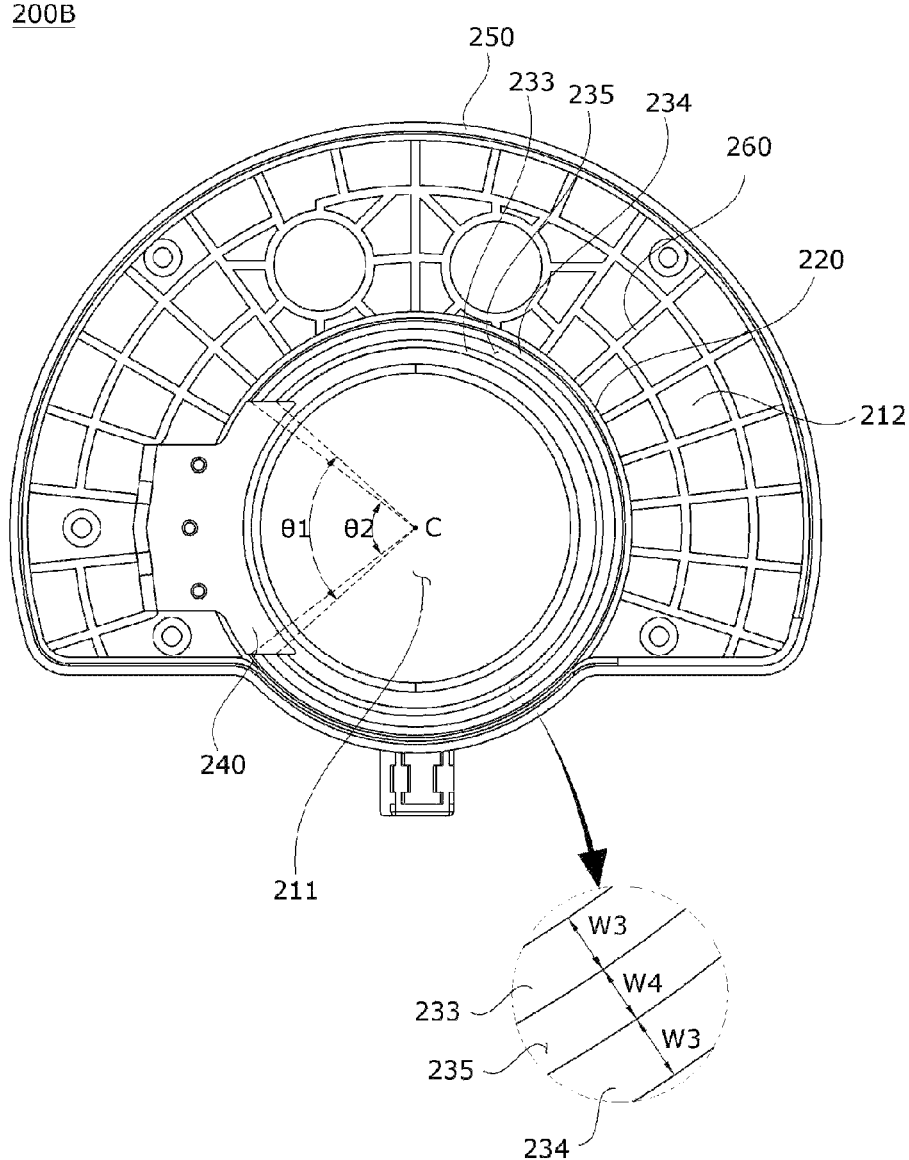

[FIG. 14]
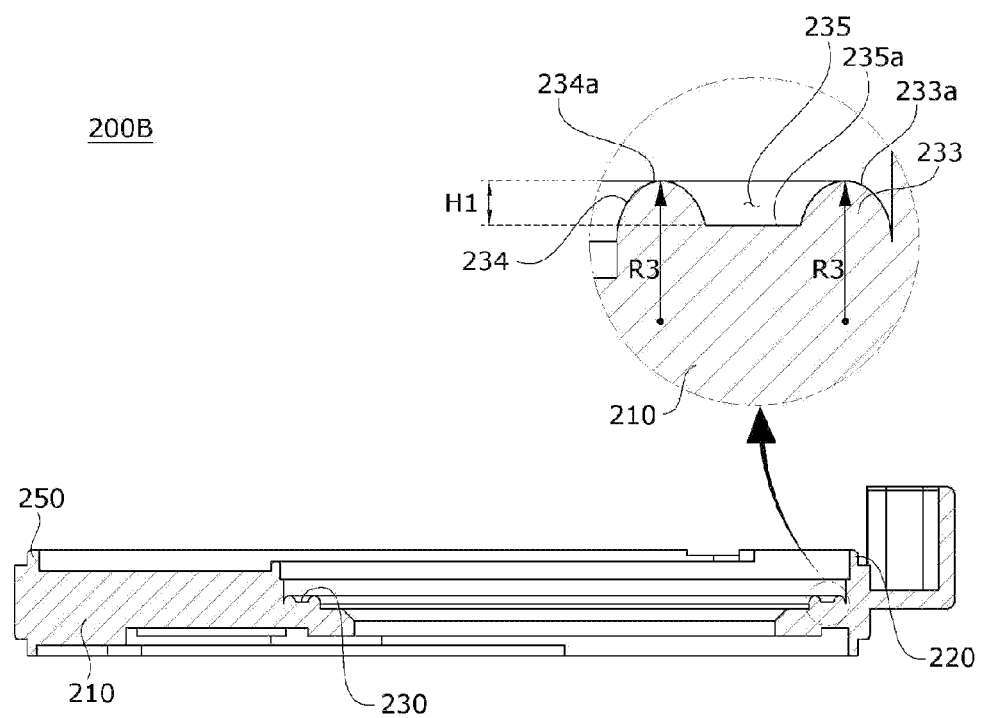

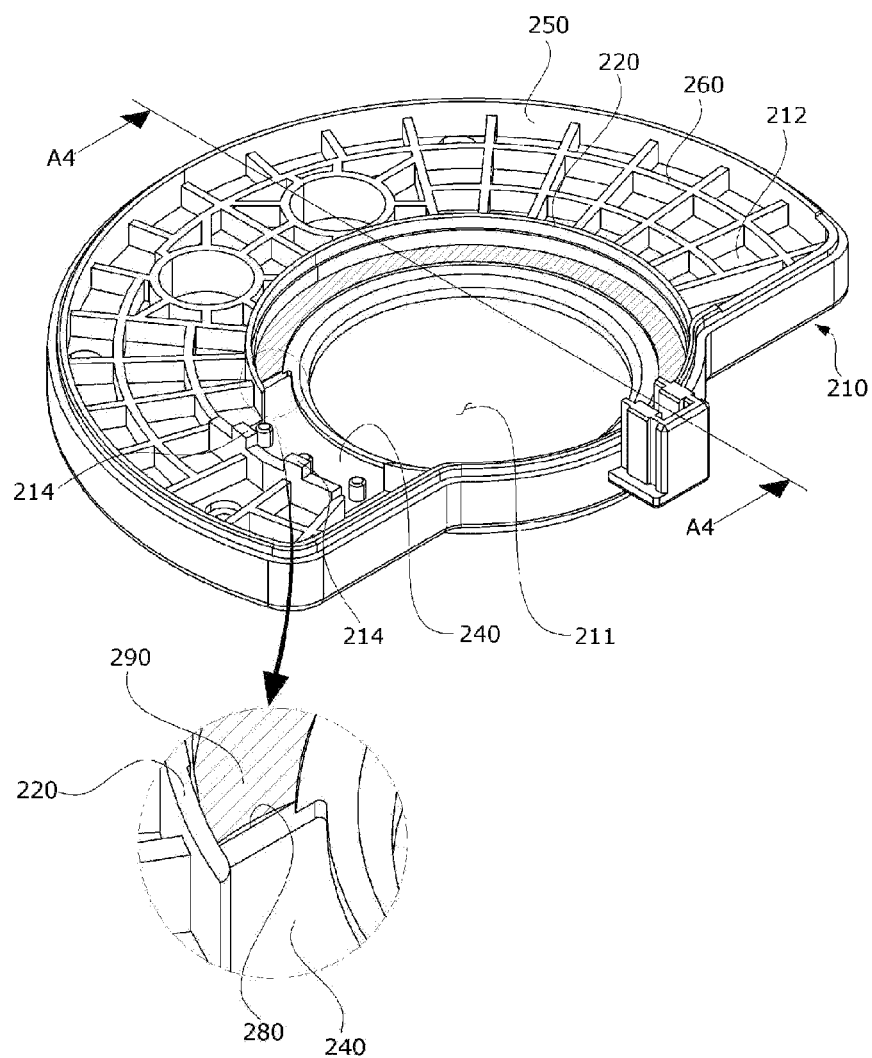
[FIG. 15]

[FIG. 16]
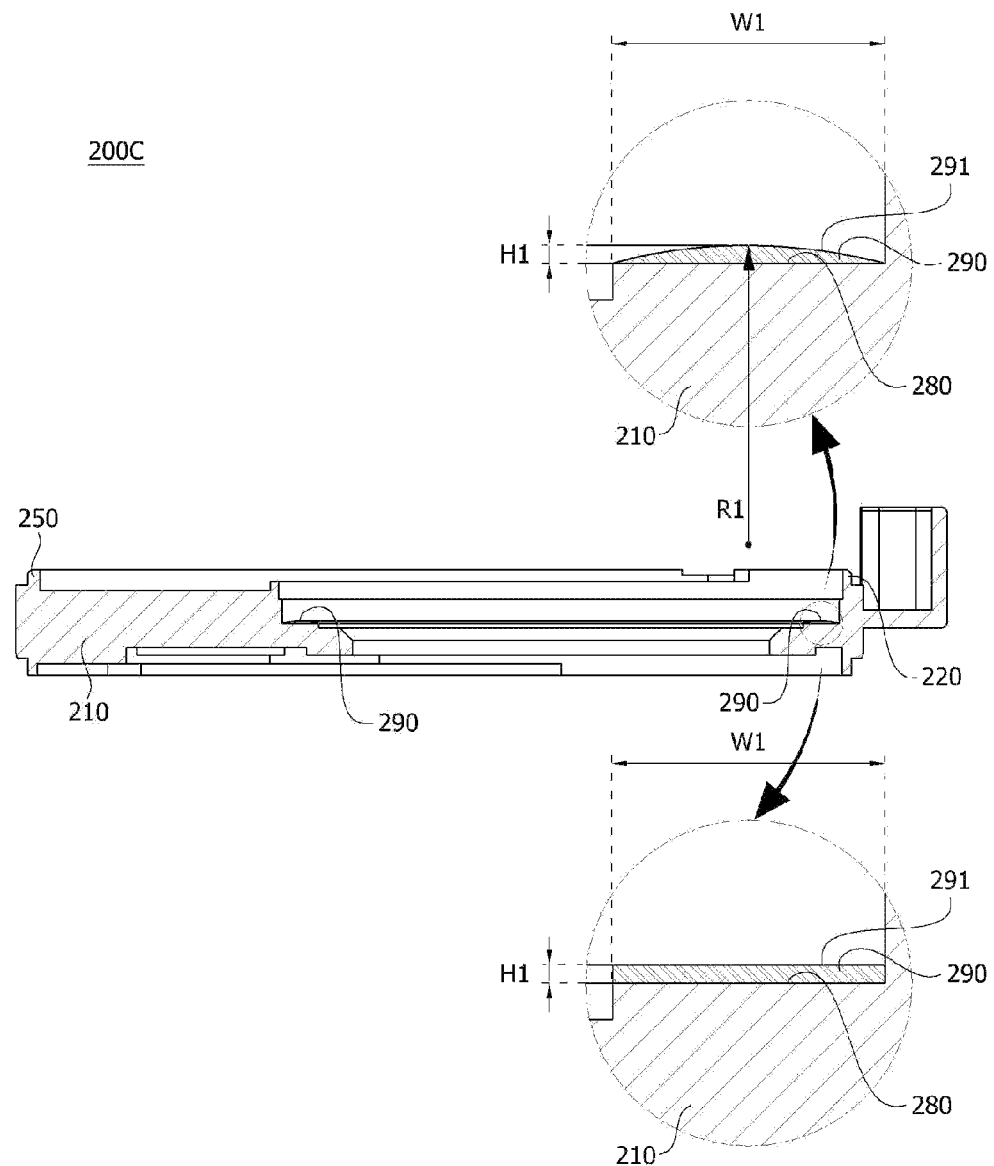

[FIG. 17]
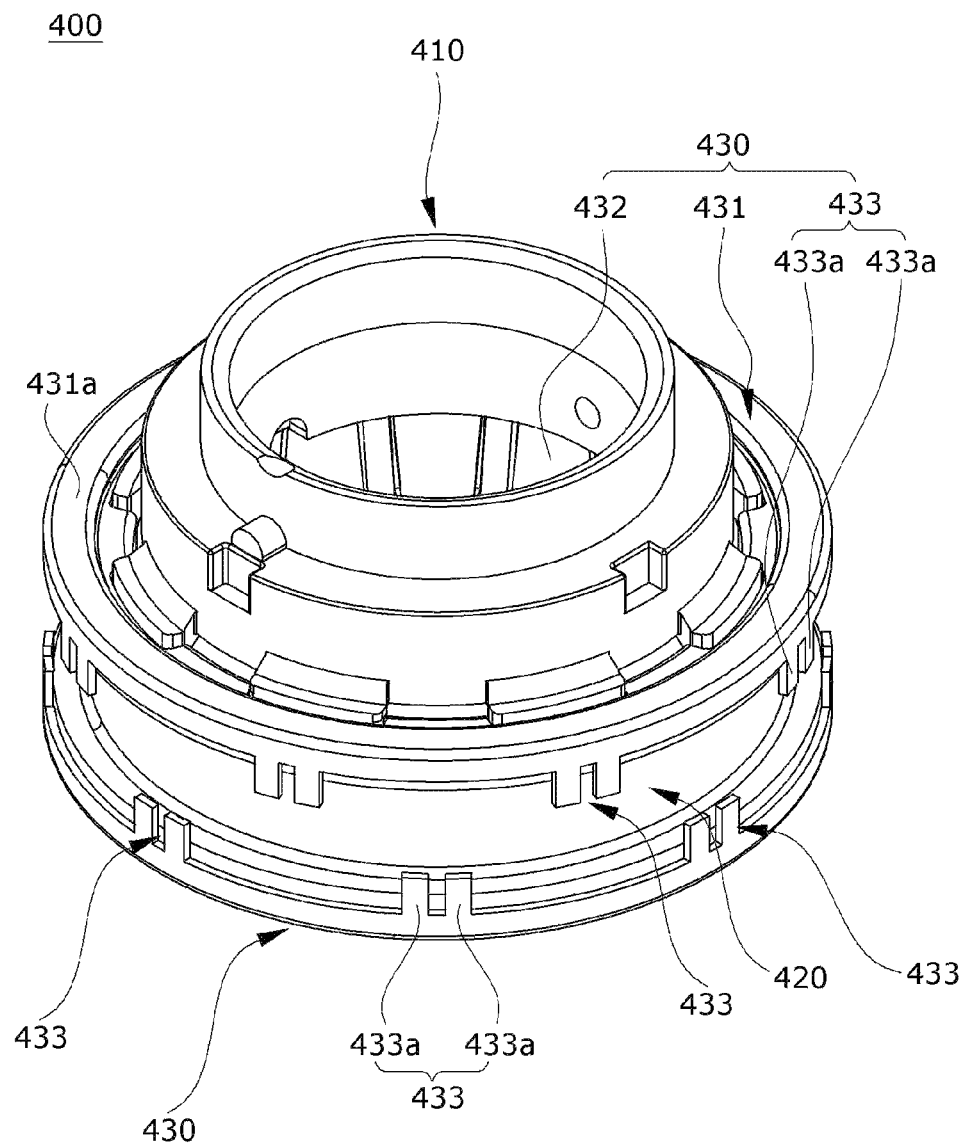

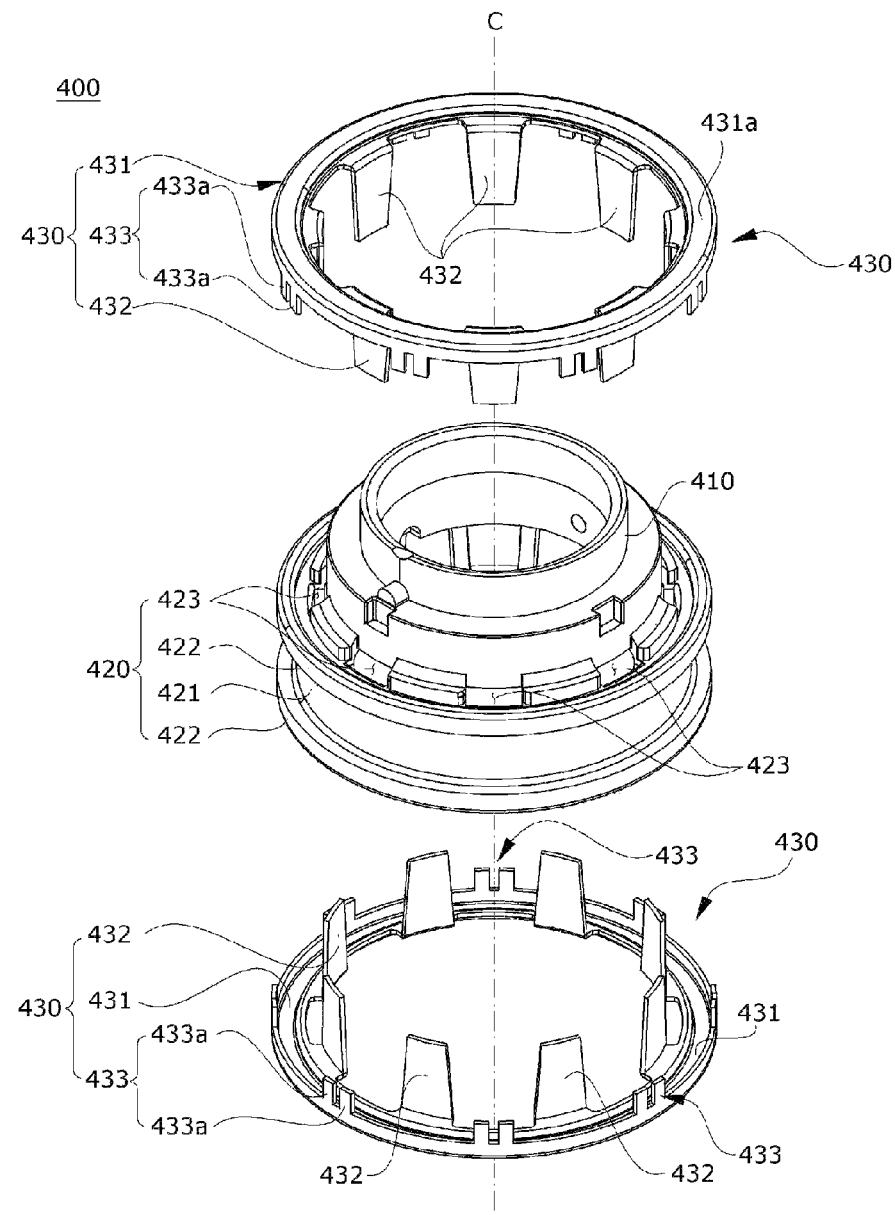
[FIG. 18]

[FIG. 19]
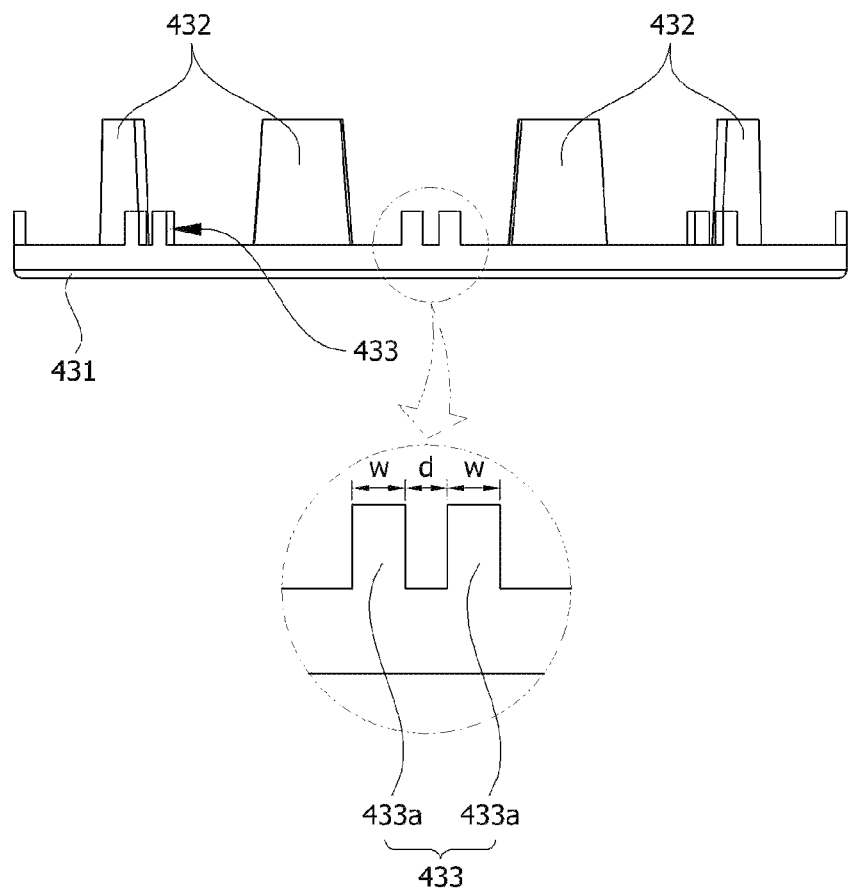

[FIG. 20]
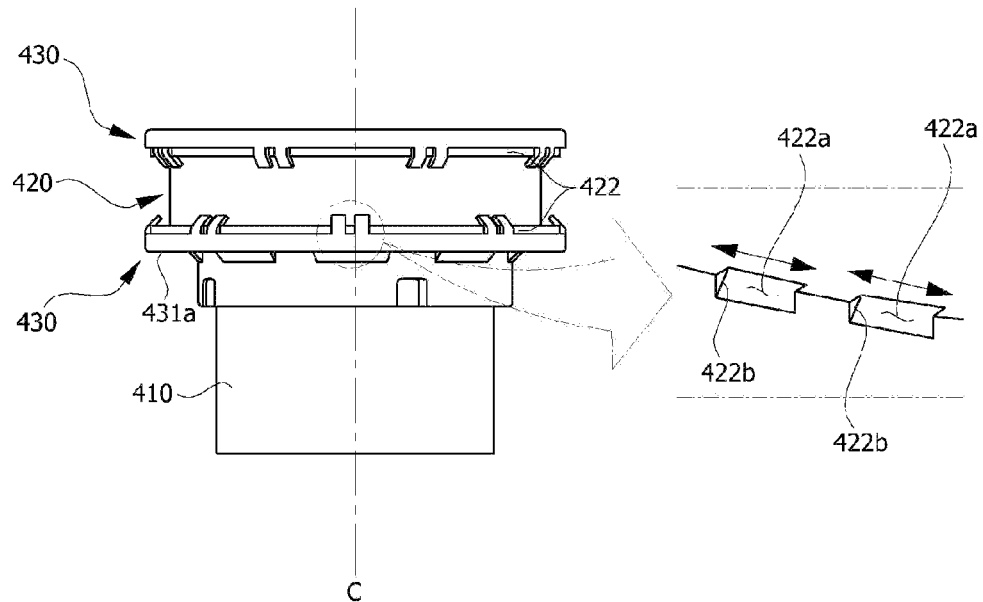
[FIG. 21]
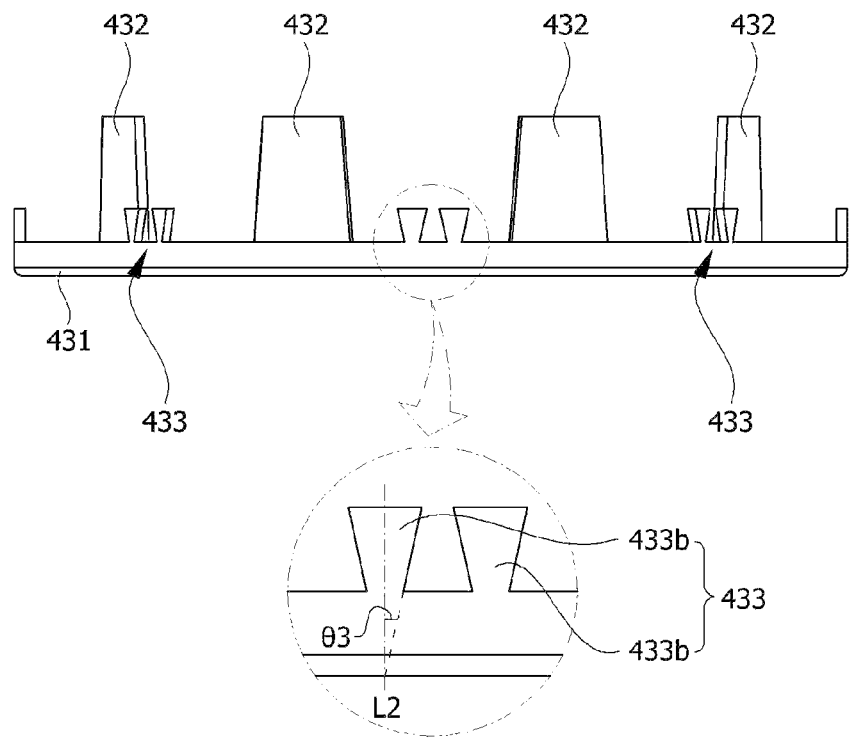

[FIG. 22]
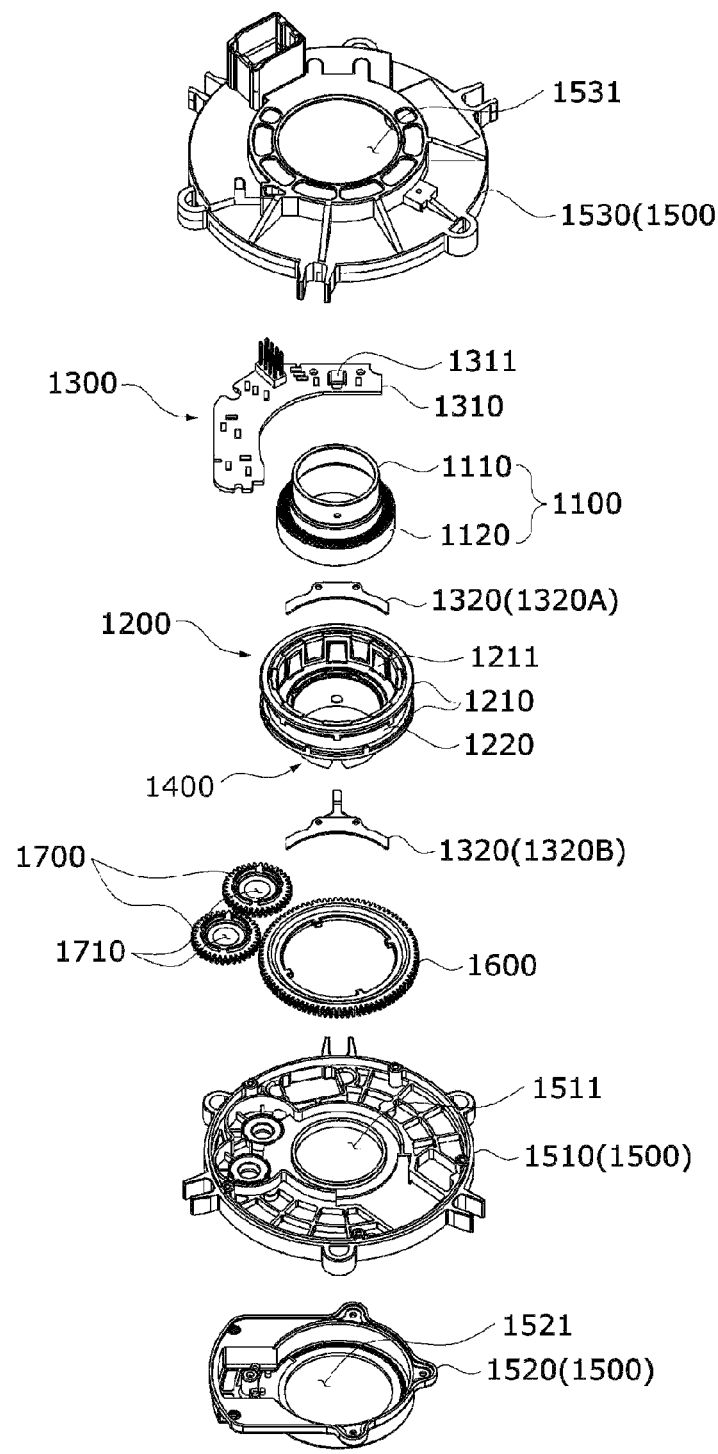

[FIG. 23]
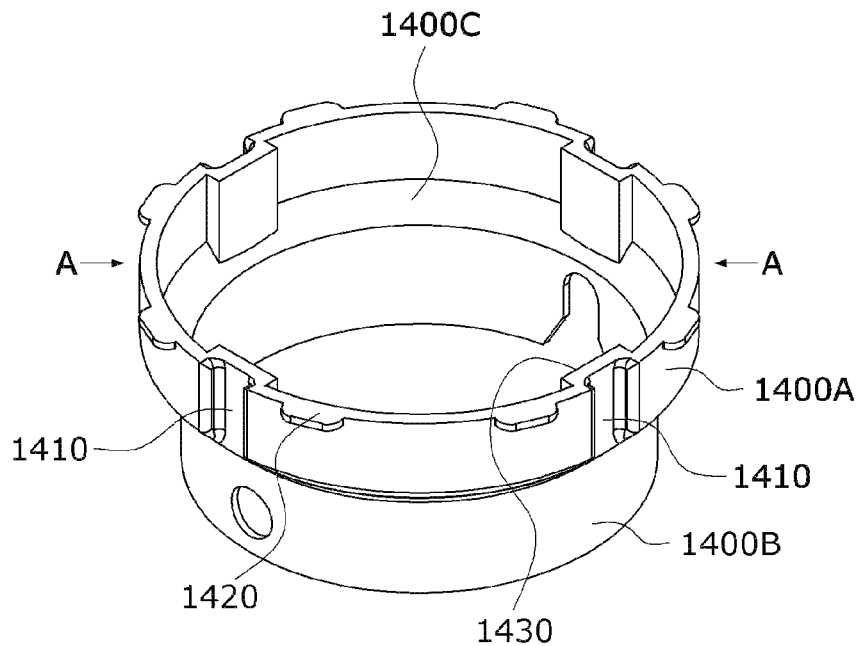
[FIG. 24]
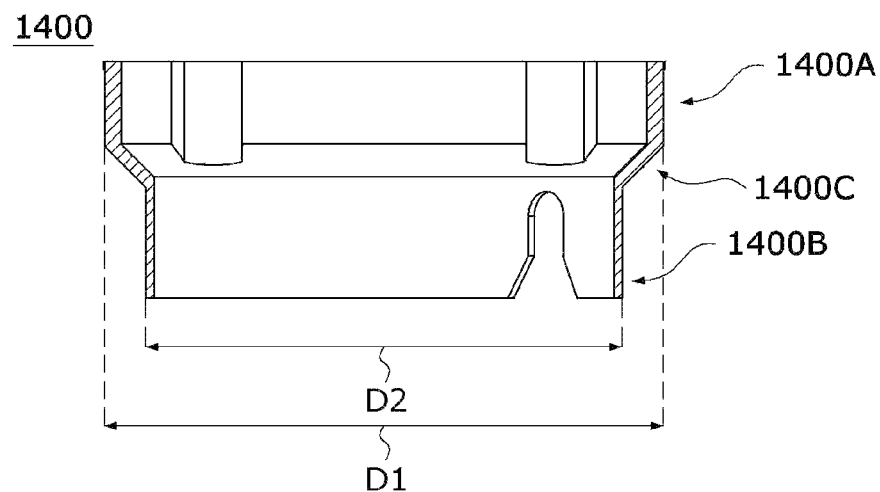

[FIG. 25]
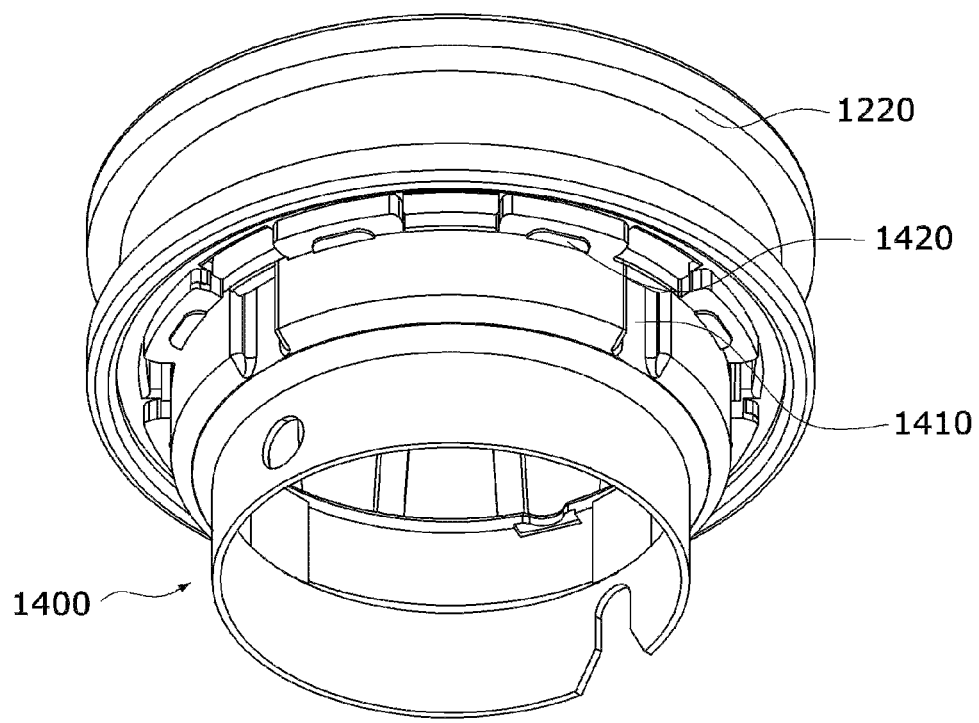

[FIG. 26]
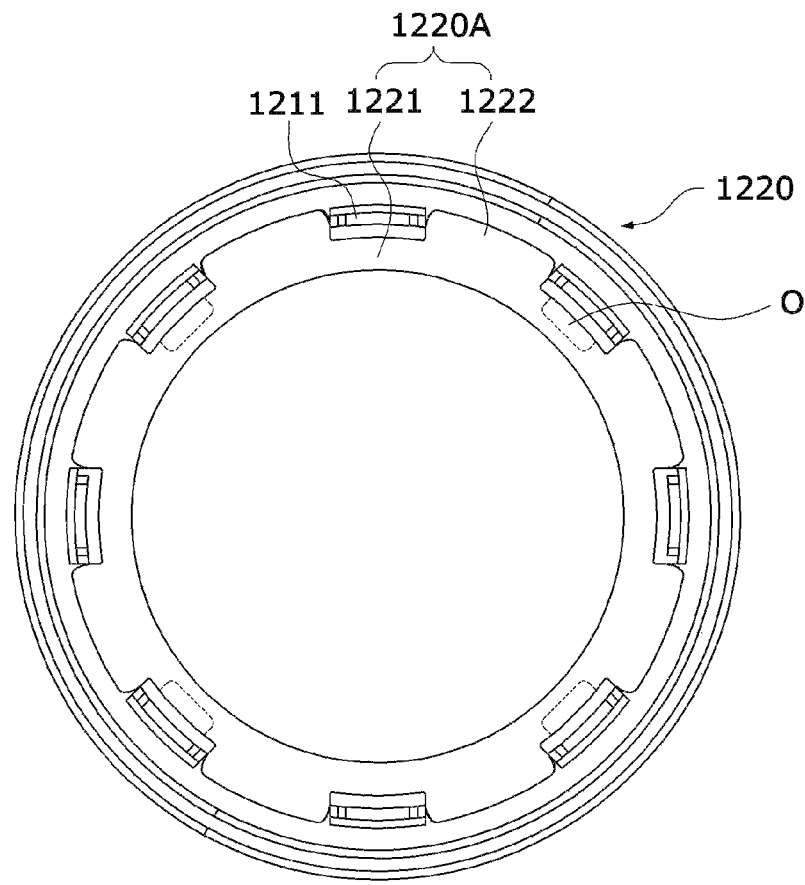
[FIG. 27]
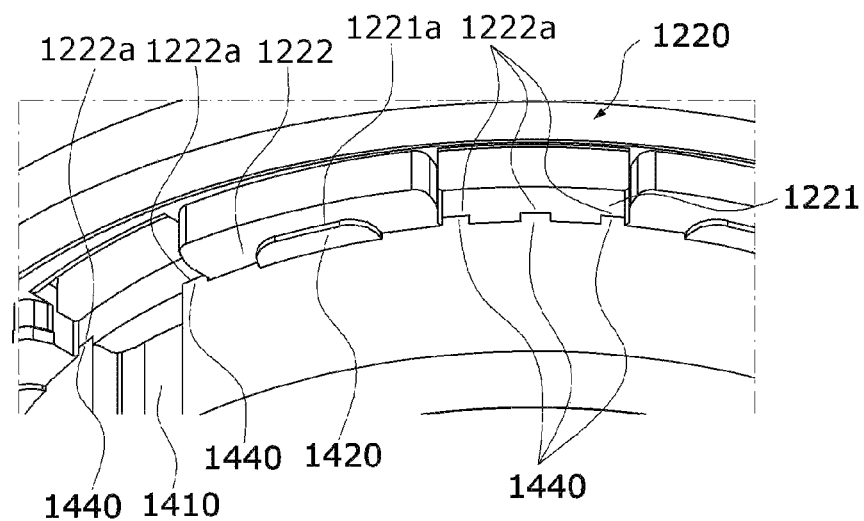

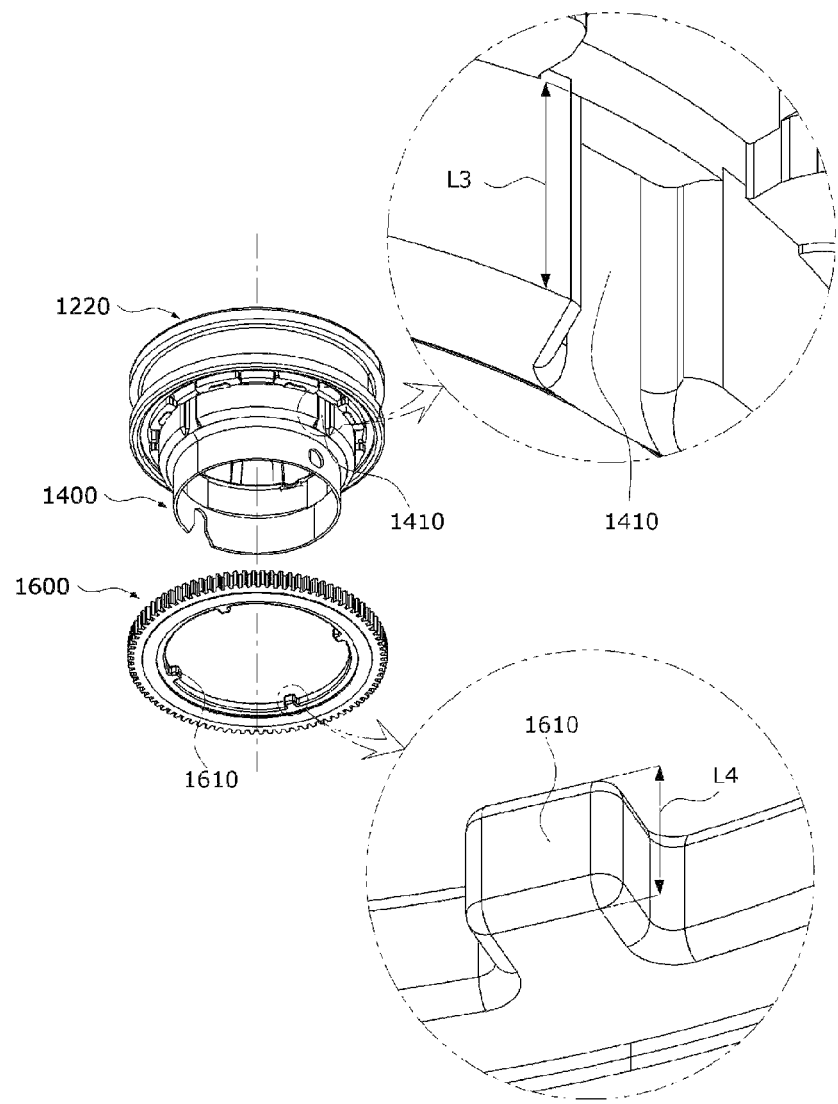
[FIG. 28]

[FIG. 29]
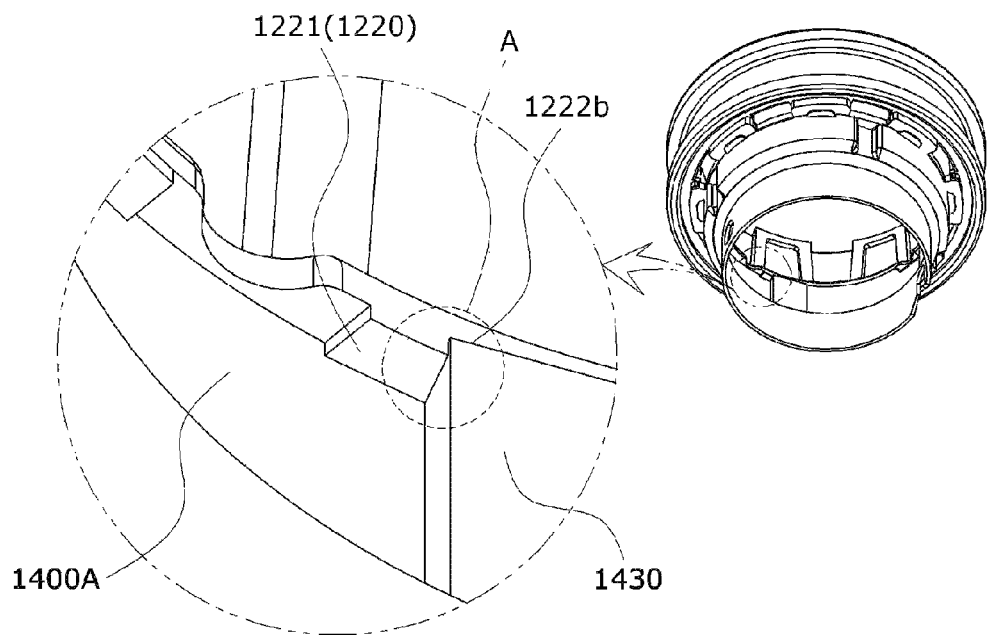

[FIG. 30]
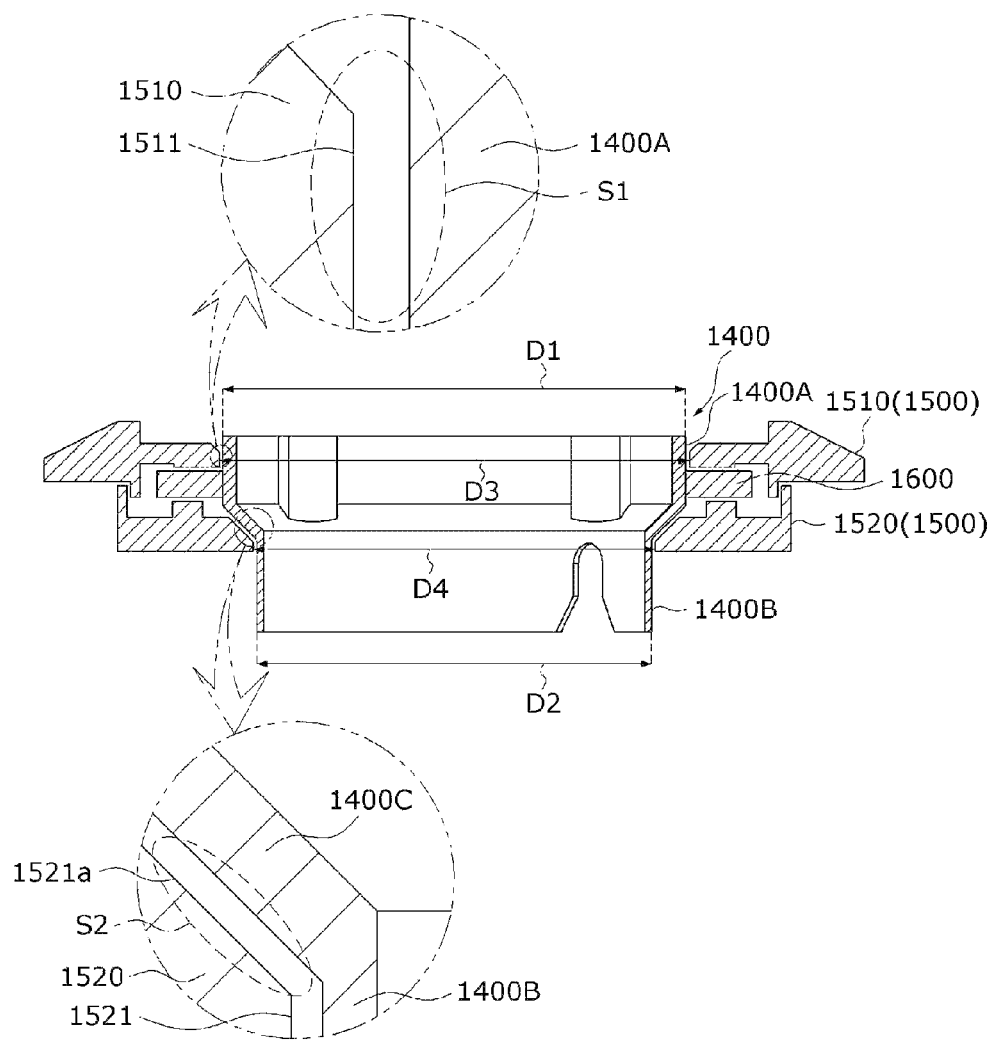

SENSING DEVICE FOR REDUCING CONTACT AMOUNT BETWEEN A STATOR AND A HOUSING TO REDUCE NOISE

CROSS REFERENCE TO RELATED APPLICATIONS

This application is the National Phase of PCT International Application No. PCT/KR2018/016430, filed on Dec. 21, 2018, which claims priority under 35 U.S.C. 119(a) to Patent Application Nos. 10-2018-0066204, filed in the Republic of Korea on Jun. 8, 2018 and 10-2018-0140530, filed in the Republic of Korea on Nov. 15, 2018, all of which are hereby expressly incorporated by reference into the present application.

TECHNICAL FIELD

An embodiment relates to a sensing device.

BACKGROUND ART

An electronic power steering system (hereinafter referred to as "EPS") operates a motor in an electronic control unit according to operating conditions to ensure the turning stability and provide a high degree of resilience, thereby allowing the driver to drive safely.

In order to provide proper torque, the EPS includes a sensor assembly configured to measure torque of a steering shaft, a steering angle, and the like. The sensor assembly may include a torque sensor configured to measure torque acting on the steering shaft, an index sensor configured to measure an angular acceleration of the steering shaft, or the like. Also, the steering shaft may include an input shaft connected to a handle, an output shaft connected to a wheel-side power transmission configuration, and a torsion bar configured to connect the input shaft and the output shaft.

The torque sensor measures a degree of torsion of the torsion bar to measure the torque acting on the steering shaft. Also, the index sensor detects rotation of the output shaft to measure the angular acceleration of the steering shaft. In the sensor assembly, the torque sensor and the index sensor may be arranged together and integrally configured.

The torque sensor may include a housing, a rotor, a stator, and a collector to measure the torque.

Here, when the torque sensor is assembled to the EPS, contact may occur due to assembly tolerance between the housing and the stator. For example, one surface of the stator may come in surface contact with a bottom surface of the housing. Accordingly, there is a problem in that, during rotation of the stator, noise occurs due to the surface contact.

Also, in a case in which the amount of surface contact between the stator and the housing is increased to minimize clearance to induce safety with respect to the function of the torque sensor, there is a problem in that the noise is further increased.

Further, there is a problem in that noise is increased due to a material difference between a stator ring of the stator and the housing.

DISCLOSURE

Technical Problem

An embodiment is directed to providing a sensing device capable of, during contact between a stator and a housing, reducing the amount of contact to reduce noise.

Also, an embodiment is directed to providing a sensing device in which a non-magnetic metal is placed in a portion of the housing coming in contact with the stator so that the noise is further reduced, and simultaneously, magnetic field interference, which may occur during torque measurement, is avoided.

Objectives of the embodiments are not limited to the above-mentioned objectives, and other unmentioned objectives should be clearly understood by those of ordinary skill in the art from the description below.

Technical Solution

An embodiment provides a sensing device including a housing, a stator disposed in the housing, and a rotor disposed in the stator, wherein the stator includes a body and a stator tooth coupled to the body, the housing includes a first surface that corresponds to a bottom surface of the stator tooth, and the first surface includes a curved surface that protrudes toward the stator tooth.

Here, the protruding curved surface of the first surface may include a non-magnetic metal.

Alternatively, the housing may include a contact member disposed on the curved surface, and the contact member may include a curved surface that protrudes toward the bottom surface of the stator tooth.

Here, the protruding curved surface of the contact member may be disposed in a central region of a width of the first surface.

Also, the contact member may be formed in an arc shape in a circumferential direction.

Alternatively, the contact member may be provided as a plurality of contact members that are spaced apart in the circumferential direction.

Also, the contact member may protrude to be higher than the first surface.

Here, the curved surface of the first surface may be formed with a first curvature, the curved surface of the contact member may be formed with a second curvature, and the second curvature may be larger than the first curvature.

Also, the contact member may be formed of a non-magnetic metal.

Also, the contact member may be disposed in the housing using an insert injection method.

Meanwhile, the first surface may include a first protruding portion and a second protruding portion, and the first protruding portion and the second protruding portion may each include a curved surface.

Here, since the first protruding portion and the second protruding portion are disposed to be spaced apart in a radial direction, a groove may be formed between the first protruding portion and the second protruding portion, and based on a sum of a width of the first protruding portion, a width of the groove, and a width of the second protruding portion, the width of the groove may be 20% to 30% of the sum.

Also, the width (W4) of the groove may be 0.50 to 0.86 times the width (W3) of the first protruding portion.

An embodiment provides a sensing device including a housing, a stator disposed in the housing, and a rotor disposed in the stator, wherein the stator includes a body and a stator tooth coupled to the body, the housing includes a contact member that comes in contact with a bottom surface of the stator tooth, and the contact member is formed of a non-magnetic metal.

Here, the contact member may be formed in an arc shape in a circumferential direction.

Alternatively, the contact member may be provided as a plurality of contact members that are spaced apart in a circumferential direction.

Meanwhile, the stator of the sensing device may include a holder, a body disposed at one side of an outer circumferential surface of the holder, and a pair of stator teeth disposed on the body, wherein each stator tooth may include a stator tooth body, teeth that protrude from an inner circumferential surface of the stator tooth body in an axial direction, and protrusion parts that protrude from an outer circumferential surface of the stator tooth body in the axial direction.

Here, when viewed in a radial direction, the protrusion parts may be disposed between the teeth, and the protrusion parts may be provided as at least two protrusions that are disposed to be spaced apart from each other.

Also, the body may include a mold member and a flange portion that protrudes from an outer circumferential surface of the mold member in the radial direction, and the protrusion may be fixed to the flange portion by caulking.

Meanwhile, the non-magnetic metal may include any one of copper, lead, tin, zinc, gold, platinum, or mercury.

An embodiment provides a sensing device including a housing, a stator disposed in the housing, a rotor disposed in the stator, a sensing portion configured to measure a magnetic field generated between the rotor and the stator, a shaft coupled to the stator, and a first gear disposed outside the shaft, wherein the shaft is disposed in an opening of the housing, the shaft comes in contact with the first gear, and a portion of an outer circumferential surface of the shaft comes in contact with an inner circumferential surface of the opening of the housing.

An embodiment provides a sensing device including a housing, a stator disposed in the housing, a rotor disposed in the stator, a sensing portion configured to measure a magnetic field generated between the rotor and the stator, a shaft coupled to the stator, and a first gear disposed outside the shaft, wherein the housing includes a first opening and a second opening that are disposed to be spaced apart in an axial direction, the shaft includes a first part and a second part that have different diameters, the first part comes in contact with the first gear, an outer diameter of the first part is smaller than a diameter of the first opening and larger than a diameter of the second opening, and an outer diameter of the second part is smaller than the diameter of the second opening.

Preferably, the first gear may include a first protrusion disposed on an inner circumferential surface of the gear, the shaft may include a first groove, and the first protrusion may be disposed in the first groove.

Preferably, the first gear may include a first protrusion disposed on an inner circumferential surface of the first gear, the shaft may include a first groove disposed at the first part, and the first protrusion may be disposed in the first groove.

Preferably, the shaft may include a third part disposed at a boundary between the first part and the second part, and an inlet of the first groove may be disposed at the third part.

Preferably, a height of the first groove may be larger than a height of the first protrusion.

Preferably, the third part may be disposed to be inclined.

Preferably, an inner circumferential surface of the second opening may include an inclined surface that comes in contact with the third part.

Preferably, the shaft may include a second protrusion, and a holder of the stator may include a second groove in which the second protrusion is disposed.

Preferably, in the axial direction, at least a portion of the holder of the stator may overlap the first groove.

Advantageous Effects

A sensing device according to an embodiment has an effect of significantly reducing noise due to friction. The sensing device can reduce the amount of contact between a stator and a housing to reduce noise.

Also, the sensing device can reduce noise between the stator and the housing by using a non-magnetic metal. Here, due to using the non-magnetic metal, the sensing device can avoid magnetic field interference that may occur during torque measurement.

In addition, since a component for fixing a first gear is omitted, the sensing device according to an embodiment has advantages in that the structure is simplified and the manufacturing cost is reduced.

DESCRIPTION OF DRAWINGS

FIG. 1 is a perspective view illustrating a sensing device according to a first embodiment.

FIG. 2 is an exploded perspective view illustrating the sensing device according to the first embodiment.

FIG. 3 is a perspective view illustrating a first embodiment of a first housing disposed in the sensing device according to the first embodiment.

FIG. 4 is a bottom perspective view illustrating the first embodiment of the first housing disposed in the sensing device according to the first embodiment.

FIG. 5 is a plan view illustrating the first embodiment of the first housing disposed in the sensing device according to the first embodiment.

FIG. 6 is a cross-sectional view illustrating the first embodiment of the first housing disposed in the sensing device according to the first embodiment.

FIG. 7 is a perspective view illustrating a second embodiment of the first housing disposed in the sensing device according to the first embodiment.

FIG. 8 is a plan view illustrating the second embodiment of the first housing disposed in the sensing device according to the first embodiment.

FIG. 9 is a cross-sectional view illustrating the second embodiment of the first housing disposed in the sensing device according to the first embodiment.

FIG. 10 is a view illustrating a modified example of arrangement of a contact member in the second embodiment of the first housing disposed in the sensing device according to the first embodiment.

FIG. 11 is a view illustrating another modified example of the arrangement of the contact member in the second embodiment of the first housing disposed in the sensing device according to the first embodiment.

FIG. 12 is a perspective view illustrating a third embodiment of the first housing disposed in the sensing device according to the first embodiment.

FIG. 13 is a plan view illustrating the third embodiment of the first housing disposed in the sensing device according to the first embodiment.

FIG. 14 is a cross-sectional view illustrating the third embodiment of the first housing disposed in the sensing device according to the first embodiment.

FIG. 15 is a perspective view illustrating a fourth embodiment of the first housing disposed in the sensing device according to the first embodiment.

FIG. 16 is a cross-sectional view illustrating the fourth embodiment of the first housing disposed in the sensing device according to the first embodiment.

FIG. 17 is a perspective view illustrating a stator disposed in the sensing device according to the first embodiment.

FIG. 18 is an exploded perspective view illustrating the stator disposed in the sensing device according to the first embodiment.

FIG. 19 is a lateral view illustrating a stator tooth disposed in the sensing device according to the first embodiment.

FIG. 20 is a view illustrating a bent protrusion part of the stator disposed in the sensing device according to the first embodiment.

FIG. 21 is a lateral view illustrating another embodiment of the stator tooth disposed in the sensing device according to the first embodiment.

FIG. 22 is a view illustrating a sensing device according to a second embodiment.

FIG. 23 is a view illustrating a shaft.

FIG. 24 is a lateral cross-sectional view of the shaft.

FIG. 25 is a view illustrating the shaft and a holder that are coupled.

FIG. 26 is a plan view illustrating the holder.

FIG. 27 is an enlarged view of a coupling portion between the shaft and the holder.

FIG. 28 is a view illustrating a first gear coupled to the shaft.

FIG. 29 is a view illustrating a protruding portion of the shaft.

FIG. 30 is a lateral cross-sectional view of the sensing device.

MODES OF THE INVENTION

Hereinafter, exemplary embodiments of the present invention will be described in detail with reference to the accompanying drawings.

However, the technical idea of the present invention is not limited to some embodiments described herein and may be implemented in various different forms. One or more elements of different embodiments may be selectively combined or replaced within the scope of the technical idea of the present invention.

Also, unless otherwise defined, all terms including technical or scientific terms used in the embodiments of the present invention may be interpreted as having a meaning that may be commonly understood by those of ordinary skill in the art to which the present invention pertains, and a meaning of commonly-used terms, such as terms defined in dictionaries, may be interpreted in consideration of a meaning in the context of related technology.

Also, the terms used in the embodiments of the present invention are for describing the embodiments and are not intended to limit the present invention.

In the present specification, a singular expression may include a plural expression unless the context clearly indicates otherwise, and "at least one (or one or more) of A, B, and C" may include one or more of any of the possible combinations of A, B, and C.

Also, in describing elements of the embodiments of the present invention, terms such as first, second, A, B, (a), and (b) may be used.

Such terms are only intended to distinguish one element from another element, and the essence, order, sequence, or the like of the corresponding element is not limited by the terms.

Also, when a certain element is described as being "connected," "coupled," or "linked" to another element, this may include not only a case in which the element is directly connected, coupled, or linked to the other element but also a case in which the element is "connected," "coupled," or "linked" to the other element via another element present therebetween.

In addition, when a certain element is described as being formed or disposed above (on) or below (under)" another element, the term "above (on) or below (under)" not only includes a case in which two elements come in direct contact with each other but also includes a case in which one or more other elements are formed or disposed between the two elements. Also, the term "above (on) or below (under)" may include a downward direction as well as an upward direction with respect to one element.

Hereinafter, the embodiments will be described in detail with reference to the accompanying drawings. The same or corresponding elements will be denoted by the same reference numerals throughout the drawings and repeated descriptions thereof will be omitted.

First Embodiment

FIG. 1 is a perspective view illustrating a sensing device according to a first embodiment, and FIG. 2 is an exploded perspective view illustrating the sensing device according to the first embodiment. In FIG. 2, the x-direction indicates an axial direction, and the y-direction indicates a radial direction. Also, the axial direction and the radial direction are perpendicular to each other.

Referring to FIGS. 1 and 2, a sensing device 1 according to the first embodiment may include a housing 100, which includes a first housing 200 and a second housing 300, a stator 400 disposed in the housing 100, a rotor 500 disposed in the stator 400, a collector 600 disposed in the housing 100, and a sensing portion 700. Here, the stator 400 may include a holder 410, a body 420 disposed at one side of an outer circumferential surface of the holder 410, and two stator teeth 430 disposed on the body 420. Also, the collector 600 disposed in the first housing 200 may be referred to as a "first collector 600A." In addition, the collector 600 disposed in the second housing 300 may be referred to as a "second collector 600B."

Here, the stator 400 may be connected to an output shaft (not illustrated), and the rotor 500 disposed inside the stator 400 may be connected to an input shaft (not illustrated), but the present invention is not necessarily limited thereto. Here, the inside may refer to a direction toward a center C in the radial direction, and the outside may refer to a direction opposite to the inside.

The housing 100 may form an exterior of the sensing device 1.

The housing 100 may include the first housing 200 and the second housing 300 that are coupled to each other to have an accommodation space therein. Also, the stator 400, the rotor 500, the collector 600, the sensing portion 700, and the like may be disposed in the accommodation space.

As illustrated in FIGS. 1 and 2, the first housing 200 and the second housing 300 may be disposed to face each other. Also, the first housing 200 and the second housing 300 may be formed of a synthetic resin material such as plastic.

One region of the first housing 200 may be disposed at a lower portion of the stator 400.

When the stator 400 is connected to the output shaft, due to assembly tolerance, contact may occur between the stator 400 and the first housing 200. Here, surface-to-surface contact may occur between the first housing 200 and the stator 400, and thus, noise may occur when the stator 400 rotates. In particular, in the case of the surface-to-surface contact, there may be a problem in that noise increases due to a large friction area.

Therefore, the sensing device 1 may reduce the amount of contact between the first housing 200 and the stator 400 to reduce noise.

FIG. 3 is a perspective view illustrating a first embodiment of a first housing disposed in the sensing device according to the first embodiment, FIG. 4 is a bottom perspective view illustrating the first embodiment of the first housing disposed in the sensing device according to the first embodiment, FIG. 5 is a plan view illustrating the first embodiment of the first housing disposed in the sensing device according to the first embodiment, and FIG. 6 is a cross-sectional view illustrating the first embodiment of the first housing disposed in the sensing device according to the first embodiment. Here, FIG. 6 is a cross-sectional view taken along line A1-A1 of FIG. 3.

Referring to FIGS. 3 to 6, the first housing 200 according to the first embodiment may include a first housing body 210 in which a first through-hole 211 is formed, an inner sidewall 220 that protrudes from an inner surface 212 of the first housing body 210 in the axial direction, a first surface 230 disposed to face the stator tooth 430 of the stator 400, and a second surface 240 at which the first collector 600A is disposed. Here, the first surface 230 and the second surface 240 may be formed at the first housing body 210.

Also, the first housing 200 may further include an outer sidewall 250 disposed to be spaced apart from the inner sidewall 220 in the radial direction. Also, the first housing 200 may further include a rib 260 disposed between the inner sidewall 220 and the outer sidewall 250. Here, the first housing body 210, the inner sidewall 220, the outer sidewall 250, and the rib 260 may be integrally formed. The first housing body 210 may include the first through-hole 211, the inner surface 212, and an outer surface 213. Here, the first surface 230 and the second surface 240 may be disposed on the first housing body 210. Also, the first housing body 210 may further include a support protrusion 214 configured to support a bent end portion of a leg 620 of the collector 600.

The holder 410 of the stator 400 may be disposed through the first through-hole 211. Also, the holder 410 may be connected to the output shaft.

The inner sidewall 220 may guide arrangement of the stator 400.

The inner sidewall 220 may be formed to protrude from the inner surface 212 of the first housing body 210 in the axial direction and, as illustrated in FIG. 5, formed in an arc shape in a plan view.

Referring to FIGS. 3 to 6, the first surface 230 may be disposed to be adjacent to the first through-hole 211. As illustrated in FIG. 5, in consideration of the position of the stator tooth 430 in the radial direction with respect to the holder 410 of the stator 400, the first surface 230 may be disposed to be spaced apart from the first through-hole 211 in the radial direction. Here, the first surface 230 may be disposed at an inner side of the inner sidewall 220.

As illustrated in FIGS. 3 and 6, the first surface 230 may be formed with a curved surface that protrudes toward the stator tooth 430 of the stator 400 in the axial direction. Accordingly, the amount of contact that occurs during contact between the first surface 230 and a bottom surface of the stator tooth 430 may be reduced.

Referring to FIG. 6, the first surface 230 may be formed to a predetermined height H1 with respect to a virtual line L1 that connects an outer corner 231 and an inner corner 232 of the first surface 230 including the curved surface. Here, the height H1 may be 0.06 to 0.07 times a width W1 of the first surface 230 in the radial direction. Here, the width W1 of the first surface 230 of the first housing 200 according to the first embodiment may be referred to as a "first width." Also, the height H1 of the first surface 230 of the first housing 200 according to the first embodiment may be referred to as a "first height."

The height H1 of the first surface 230 may be adjusted due to a separation relationship with the bottom surface of the stator tooth 430. For example, since a separation distance between the first surface 230 and the bottom surface of the stator tooth 430 affects performance, the height H1 of the first surface 230 may be adjusted due to the separation distance in design.

Also, the curved surface may be formed with a predetermined curvature 1/R1 in a cross-sectional view so that a central region of the curved surface protrudes. Accordingly, the first surface 230 and the bottom surface of the stator tooth 430 may also come in line contact.

Referring to FIG. 5, when viewed from the stator 400 side, the first surface 230 may be formed in an arc shape in a plan view. As illustrated in FIG. 5, the first surface 230 may be formed in a C-shape in a plan view.

Referring to FIG. 3, the first surface 230 may be formed to be higher than the second surface 240. Accordingly, even when the collector 600 is disposed at the second surface 240, the bottom surface of the stator tooth 430 may come in contact with the first surface 230.

Meanwhile, the protruding curved surface of the first surface 230 may include a non-magnetic metal. Accordingly, the curved surface including the non-magnetic metal may come in contact with the bottom surface of the stator tooth 430. Here, the non-magnetic metal may include any one of copper, lead, tin, zinc, gold, platinum, mercury or a combination thereof.

The non-magnetic metal may improve surface roughness and lubricating performance. Also, the non-magnetic metal may improve performance of resistance to wear due to contact. Accordingly, the non-magnetic metal may reduce noise that occurs due to friction with the first surface 230 and the stator tooth 430 of the stator 400.

The non-magnetic metal may be provided as a member disposed at the protruding curved surface of the first surface 230. Alternatively, the non-magnetic metal powder may be applied on the protruding curved surface of the first surface 230. Alternatively, the first housing 200 may be formed to include the non-magnetic metal so that the non-magnetic metal is disposed at the protruding curved surface of the first surface 230.

The first collector 600A may be disposed on the second surface 240. The second surface 240 may be formed to be lower than the first surface 230.

Referring to FIG. 5, the second surface 240 may be disposed between both end portions of the first surface 230 formed in a C-shape in a plan view in the circumferential direction.

The outer sidewall 250 may form an exterior of the first housing 200 together with the first housing body 210.

The outer sidewall 250 may be formed to protrude from the inner surface 212 of the first housing body 210 in the axial direction. As illustrated in FIG. 3, the outer sidewall 250 may be formed to protrude from an outer side surface of the first housing body 210 toward the second housing 300 in the axial direction.

Also, the outer sidewall 250 may be disposed to be spaced apart from the inner sidewall 220 in the radial direction. Here, the outer sidewall 250 may be disposed outside the inner sidewall 220.

The rib 260 may improve a rigidity of the first housing 200. Accordingly, using the rib 260, the first housing 200 may deal with deformation of the first housing 200, which is formed of a synthetic resin material, or an external force applied from the outside.

The rib 260 may be disposed between the inner sidewall 220 and the outer sidewall 250. Here, the rib 260 may be formed to protrude from the inner surface 212 in the axial direction. As illustrated in FIGS. 3 and 5, the rib 260 may be formed in a lattice shape.

FIG. 7 is a perspective view illustrating a second embodiment of the first housing disposed in the sensing device according to the first embodiment, FIG. 8 is a plan view illustrating the second embodiment of the first housing disposed in the sensing device according to the first embodiment, and FIG. 9 is a cross-sectional view illustrating the second embodiment of the first housing disposed in the sensing device according to the first embodiment. Here, FIG. 9 is a cross-sectional view taken along line A2-A2 of FIG. 7.

In describing a first housing 200A according to the second embodiment with reference to FIGS. 7 to 9, elements which are the same as those of the first housing 200 according to the first embodiment will be denoted by the same reference numerals, and detailed description thereof will be omitted.

The first housing 200A according to the second embodiment may be used in place of the first housing 200 according to the first embodiment in the sensing device 1.

Referring to FIGS. 7 to 9, the first housing 200A according to the second embodiment may include a first housing body 210 in which a first through-hole 211 is formed, an inner sidewall 220 that protrudes from an inner surface 212 of the first housing body 210 in the axial direction, a first surface 230 disposed to face the stator tooth 430 of the stator 400, a second surface 240 at which the first collector 600A is disposed, and a contact member 270.

Also, the first housing 200A may further include an outer sidewall 250 disposed to be spaced apart from the inner sidewall 220 in the radial direction. Also, the first housing 200A may further include a rib 260 disposed between the inner sidewall 220 and the outer sidewall 250.

The contact member 270 may be disposed on the first surface 230. Also, the contact member 270 may come in contact with the bottom surface of the stator tooth 430. Here, the first surface 230 may be formed with a curved surface.

The contact member 270 may be disposed in a central region of the first surface 230 in the radial direction. Accordingly, the contact member 270 may be formed in an arc shape in a plan view. As illustrated in FIG. 8, the contact member 270 may be formed in a C-shape in a plan view.

Referring to FIGS. 7 to 9, the contact member 270 may be disposed in a central region of a width W1 of the first surface 230. Here, the contact member 270 may be formed to have a predetermined width W2 in the radial direction. Here, the width W2 of the contact member 270 may be referred to as a "second width."

Also, the width W2 of the contact member 270 may be 0.2 to 0.3 times the width W1 of the first surface 230.

Referring to FIG. 7, the contact member 270 may include a curved surface 271 that protrudes toward the bottom surface of the stator tooth 430.

The curved surface 271 of the contact member 270 may be formed with a predetermined curvature 1/R1 in a cross-sectional view so that a central region of the curved surface 271 protrudes. Here, the curvature of the curved surface 271 of the contact member 270 may be the same as the curvature of the first surface 230 formed with a curved surface.

Also, the contact member 270 may be formed to a predetermined height H1 with respect to a virtual line L1 that connects an outer corner 231 and an inner corner 232 of the first surface 230. Here, a case in which the contact member 270 is formed to the predetermined height H1 has been described as an example, but the present invention is not necessarily limited thereto. For example, the contact member 270 may be formed to a height smaller than the predetermined height H1.

As illustrated in FIG. 9, the curved surface 271 of the contact member 270 may be formed to the predetermined height H1 with respect to the virtual line L1.

Also, as illustrated in FIG. 9, one region of the contact member 270 may be disposed inside the first housing body 210. Here, the contact member 270 may be disposed in the first housing 200A using an insert injection method. Accordingly, since the contact member 270 may be supported by the first housing body 210, even when an external force is applied to the contact member 270, the contact member 270 may deal with the external force. Also, due to being supported by the first housing body 210, the contact member 270 is prevented from falling out of the first housing 200A.

Meanwhile, the contact member 270 may be formed of a non-magnetic metal.

The contact member 270 formed of the non-magnetic metal material may improve surface roughness and lubricating performance. Accordingly, the contact member 270 may reduce noise generated due to friction. Also, the contact member 270 formed of the non-magnetic metal material may improve performance of resistance to wear due to contact.

FIG. 10 is a view illustrating a modified example of arrangement of a contact member in the second embodiment of the first housing disposed in the sensing device according to the first embodiment. FIG. 10 is a cross-sectional view taken along line A2-A2 of FIG. 7.

The contact member 270 of the first housing 200A may be disposed in the central region of the first surface 230. For example, the contact member 270 may be disposed in the central region of the width W1 of the first surface 230. Here, the contact member 270 may be formed to have a predetermined width W2 in the radial direction.

The contact member 270 may be formed in an arc shape in a plan view. As illustrated in FIG. 8, the contact member 270 may be formed in a C-shape in a plan view.

Also, a portion of the contact member 270 may protrude to be higher than the first surface 230. Accordingly, the curved surface 271 of the contact member 270 may be disposed to be higher than the first surface 230.

Referring to FIG. 10, the contact member 270 may be formed to the predetermined height H1 with respect to the virtual line L1 that connects the outer corner 231 and the inner corner 232 of the first surface 230. As illustrated in FIG. 10, the curved surface 271 of the contact member 270 may be formed to the predetermined height H1 with respect to the virtual line L1. Here, the first surface 230 may be formed to a predetermined height H2 with respect to the virtual line L1.

Here, the height H1 of the curved surface 271 of the contact member 270 may be referred to as a "second height," and the predetermined height H2 of the first surface 230 may be referred to as a "third height." Accordingly, the second height is larger than the third height.

Meanwhile, a curvature of the first surface 230 formed with a curved surface may be different from a curvature of the curved surface 271 of the contact member 270.

Referring to FIG. 10, the first surface 230 may be formed to have a predetermined curvature 1/R1. Also, the curved surface 271 of the contact member 270 may be formed to have a predetermined curvature 1/R2. Here, the curvature 1/R1 of the first surface 230 may be referred to as a "first curvature," and the curvature 1/R2 of the curved surface 271 of the contact member 270 may be referred to as a "second curvature." Accordingly, the first curvature may be different from the second curvature. Specifically, the second curvature may be larger than the first curvature.

A case in which the contact member 270 is formed with the curved surface 271 having the predetermined curvature 1/R2 has been described as an example, but the present invention is not necessarily limited thereto. For example, in a case in which the contact member 270 is disposed to be higher than the first surface 230, an upper surface of the contact member 270 that comes in contact with the bottom surface of the stator 400 may also be formed with a flat surface. Although the amount of contact increases as compared to when the contact member 270 is formed with a curved surface, since the contact member 270 is disposed in one region of the first surface 230, the amount of contact is reduced as compared to the conventional case in which surface-to-surface contact occurs.

Also, in a case in which the curved surface 271 of the contact member 270 is disposed to be higher than the first surface 230, the first surface 230 may also be formed with a flat surface.

FIG. 11 is a view illustrating another modified example of the arrangement of the contact member in the second embodiment of the first housing disposed in the sensing device according to the first embodiment. FIG. 11 is a perspective view illustrating the arrangement of the contact member in the second embodiment of the first housing disposed in the sensing device according to the first embodiment.

Referring to FIG. 11, the contact member 270 of the first housing 200A may be provided as a plurality of contact members 270 that are spaced apart in the circumferential direction.

Here, even in a case in which the height of the contact member 270 and the height of the first surface 230 are the same with respect to the virtual line L1 that connects the outer corner 231 and the inner corner 232 of the first surface 230, since the contact member 270 is formed of the non-magnetic metal material, the contact member 270 may reduce the noise generated due to friction.

Alternatively, in a case in which the height of the contact member 270 is larger than the height of the first surface 230 with respect to the virtual line L1 connecting the outer corner 231 and the inner corner 232 of the first surface 230, the amount of contact between the bottom surface of the stator tooth 430 and the contact members 270, which are disposed to be spaced apart from each other in the circumferential direction as illustrated in FIG. 11, is further reduced.

FIG. 12 is a perspective view illustrating a third embodiment of the first housing disposed in the sensing device according to the first embodiment, FIG. 13 is a plan view illustrating the third embodiment of the first housing disposed in the sensing device according to the first embodiment, and FIG. 14 is a cross-sectional view illustrating the third embodiment of the first housing disposed in the sensing device according to the first embodiment. Here, FIG. 14 is a cross-sectional view taken along line A3-A3 of FIG. 12.

In describing a first housing 200B according to the third embodiment with reference to FIGS. 12 to 14, elements which are the same as those of the first housing 200 according to the first embodiment and the first housing 200A according to the second embodiment will be denoted by the same reference numerals, and detailed description thereof will be omitted.

The first housing 200B according to the third embodiment may be used in place of the first housing 200 according to the first embodiment in the sensing device 1.

Referring to FIGS. 12 to 14, the first housing 200B according to the third embodiment may include a first housing body 210 in which a first through-hole 211 is formed, an inner sidewall 220 that protrudes from an inner surface 212 of the first housing body 210 in the axial direction, a first surface 230 disposed to face the stator tooth 430 of the stator 400, and a second surface 240 at which the first collector 600A is disposed. Here, the first surface 230 may include a first protruding portion 233 and a second protruding portion 234 that are disposed to be spaced apart from each other in the radial direction. Also, in consideration of the amount of contact, the first protruding portion 233 and the second protruding portion 234 may each include a curved surface.

Also, the first housing 200B may further include an outer sidewall 250 disposed to be spaced apart from the inner sidewall 220 in the radial direction. Also, the first housing 200B may further include a rib 260 disposed between the inner sidewall 220 and the outer sidewall 250.

The first housing 200B may include the first protruding portion 233 and the second protruding portion 234 disposed inside the first protruding portion 233. Here, the first protruding portion 233 and the second protruding portion 234 may each extend to protrude from the first housing body 210 in the axial direction with respect to the inner surface 212 of the first housing body 210.

Since the first protruding portion 233 and the second protruding portion 234 are disposed to be spaced apart in the radial direction, a groove 235 may be formed between the first protruding portion 233 and the second protruding portion 234.

Here, the first protruding portion 233 may include a curved surface 233a formed with a predetermined curvature. Also, the second protruding portion 234 may include a curved surface 234a formed with a predetermined curvature. Here, the curvature of the curved surface 233a of the first protruding portion 233 and the curvature of the curved surface 234a of the second protruding portion 234 may be the same, but the present invention is not necessarily limited thereto.

As illustrated in FIG. 14, the curvature of the curved surface 233a of the first protruding portion 233 and the curved surface 234a of the second protruding portion 234, which are formed with the same curvature 1/R3, may be referred to as a "third curvature."

The curved surface 233a of the first protruding portion 233 and the curved surface 234a of the second protruding portion 234, which are disposed with the groove 235 disposed therebetween, may each come in contact with the bottom surface of the stator tooth 430. Accordingly, movement of the stator 400 due to rotation thereof may be minimized.

The first protruding portion 233 and the second protruding portion 234 may each be formed in a C-shape in a plan view. Accordingly, the groove 235 may also be formed in a C-shape in a plan view.

Referring to FIG. 14, the second surface 240, on which the first collector 600A is disposed, is disposed between one side end and the other side end of each of the first protruding portion 233 and the second protruding portion 234 in the circumferential direction. Accordingly, one region of the first collector 600A is disposed between the one side end and the other side end of each of the first protruding portion 233 and the second protruding portion 234.

As illustrated in FIG. 13, the one side end and the other side end of the first protruding portion 233 may form a first angle θ1 with respect to the center C. Also, the one side end and the other side end of the second protruding portion 234 may form a second angle θ2 with respect to the center C. The second angle θ2 is smaller than the first angle θ1. Here, the center C may be a center C of the first through-hole 211. Also, the center C may be a center C of the sensing device 1.

Meanwhile, the first protruding portion 233 and the second protruding portion 234 may be formed with the same width in the radial direction, but the present invention is not necessarily limited thereto. In consideration of the mobility of the stator 400 due to contact between the bottom surface of the stator tooth 430 and each of the first protruding portion 233 and the second protruding portion 234, the first protruding portion 233 and the second protruding portion 234 may also be formed with different widths.

Based on a sum of a width W3 of the first protruding portion 233, a width W4 of the groove 235, and the width W3 of the second protruding portion 234, the width W4 of the groove 235 may be 20% to 30% of the sum.

The width W4 of the groove 235 may be 0.50 to 0.86 times the width W3 of the first protruding portion 233. For example, a ratio of W3 to W4 may be in a range of 1:0.50 to 1:0.86.

Accordingly, due to the groove 235, the amount of contact with the bottom surface of the stator tooth 430 is reduced.

That is, in consideration of the amount of noise generated in the sensing device 1 due to rotation of the stator 400 and the stability of supporting the stator 400 by the first protruding portion 233 and the second protruding portion 234, it is preferable that the width W4 of the groove 235 is 0.50 to 0.86 times the width W3 of the first protruding portion 233.

Also, with respect to a bottom surface 235a of the groove 235, the curved surface 233a of the first protruding portion 233 and the curved surface 234a of the second protruding portion 234 may each be formed to a predetermined height H1. Here, the height H1 of each of the curved surface 233a of the first protruding portion 233 and the curved surface 234a of the second protruding portion 234 may be 0.06 to 0.07 times the sum of the width W3 of the first protruding portion 233, the width W4 of the groove 235, and the width W3 of the second protruding portion 234.

Meanwhile, a lubricating member (not illustrated) may be applied on an upper portion of each of the first protruding portion 233 and the second protruding portion 234.

The lubricating member further reduces noise generated during rotation of the stator 400. Here, grease may be used as the lubricating member.

Also, when the stator 400 rotates, the groove 235 may prevent the lubricating member from scattering or falling and allow the lubricating member to be concentrated on the curved surface 233a of the first protruding portion 233 and the curved surface 234a of the second protruding portion 234.

FIG. 15 is a perspective view illustrating a fourth embodiment of the first housing disposed in the sensing device according to the first embodiment, and FIG. 16 is a cross-sectional view illustrating the fourth embodiment of the first housing disposed in the sensing device according to the first embodiment. Here, FIG. 16 is a cross-sectional view taken along line A4-A4 of FIG. 15.

In describing a first housing 200C according to the fourth embodiment with reference to FIGS. 15 and 16, elements which are the same as those of the first housing 200 according to the first embodiment and the first housing 200A according to the second embodiment will be denoted by the same reference numerals, and detailed description thereof will be omitted.

The first housing 200C according to the fourth embodiment may be used in place of the first housing 200 according to the first embodiment in the sensing device 1.

Referring to FIGS. 15 and 16, the first housing 200C according to the fourth embodiment may include a first housing body 210 in which a first through-hole 211 is formed, an inner sidewall 220 that protrudes from an inner surface 212 of the first housing body 210 in the axial direction, a second surface 240 at which the first collector 600A is disposed, a third surface 280 disposed below the stator tooth 430 of the stator 400, and a contact member 290 disposed at the third surface 280 to face the stator tooth 430 of the stator 400.

Here, since the contact member 270 of the first housing 200A according to the second embodiment may be referred to as a "first contact member," the contact member 290 of the first housing 200C according to the fourth embodiment may be referred to as a "second contact member." Comparing the contact member 290 of the first housing 200C and the contact member 270 of the first housing 200A, there is a difference in that the contact member 290 of the first housing 200C does not have a portion disposed inside the first housing body 210. Accordingly, the contact member 290 of the first housing 200C may be fixed to the third surface 280 using a fixing member such as an adhesive.

Also, the first housing 200C may further include an outer sidewall 250 disposed to be spaced apart from the inner sidewall 220 in the radial direction. Also, the first housing 200C may further include a rib 260 disposed between the inner sidewall 220 and the outer sidewall 250.

The third surface 280 may be formed on the first housing body 210.

The third surface 280 may be disposed to be spaced apart from the first through-hole 211 in the radial direction. Here, the third surface 280 may be disposed at an inner side of the inner sidewall 220. That is, the third surface 280 may be disposed between the first through-hole 211 and the inner sidewall 220.

As illustrated in FIGS. 15 and 16, the third surface 280 may be formed with a flat surface. Also, the third surface 280 may be formed to be higher than the second surface 240.

The contact member 290 of the first housing 200C may be disposed at the third surface 280. Also, the contact member 290 may come in contact with the bottom surface of the stator tooth 430.

The contact member 290 may be formed in an arc shape in a plan view. For example, the contact member 290 may be formed in a C-shape in a plan view. Here, the contact member 290 may be formed to have a predetermined width W1 in the radial direction. Accordingly, the width of the contact member 290 may be the same as the width of the first surface 230. Here, the width of the first surface 230 in the radial direction may be the same as the width of the third surface 280 in the radial direction.

The contact member 290 may be formed of a non-magnetic metal.

The contact member 290 formed of the non-magnetic metal material may improve surface roughness and lubricating performance. Accordingly, the contact member 290 may reduce noise generated due to friction. Also, the contact member 290 formed of the non-magnetic metal material may improve performance of resistance to wear due to contact.

Referring to FIG. 16, an upper surface 291 of the contact member 290 may be formed with a flat surface or a curved surface.

Since the contact member 290 may be formed of a non-magnetic metal even when the upper surface 291 of the contact member 290 is formed with a flat surface as illustrated in FIG. 16, the contact member 290 may reduce the noise due to contact.

Alternatively, the upper surface 291 of the contact member 290 may be formed with a curved surface.

The upper surface 291 of the contact member 290 formed with the curved surface may be formed to have a predetermined curvature 1/R1 in a cross-sectional view so that a central region of the upper surface 291 protrudes. For example, the curvature of the upper surface 291 of the contact member 290 may be formed to be the same as the curvature of the first surface 230 of the first housing 200 according to the first embodiment.

Also, the contact member 290 may be formed to the predetermined height H1 with respect to the third surface 280. Accordingly, the height of the upper surface 291 of the contact member 290 may be formed to be the same as the height of the first surface 230 of the first housing 200 according to the first embodiment.

Referring to FIG. 16, the height H1 of the contact member 290 may be 0.06 to 0.07 times the width W1 of the contact member 290 in the radial direction.

Referring to FIGS. 1 and 2, the second housing 300 may be disposed above the first housing 200.

A second through-hole 310 for arrangement of the rotor 500 may be formed in the second housing 300. Here, the rotor 500 may be connected to an input shaft, and the input shaft may be connected to a steering handle.

Also, the second collector 600B may be disposed at an inner surface of the second housing 300.

The stator 400 may be rotatably disposed inside the housing 100. Here, the stator 400 is disposed outside the rotor 500.

FIG. 17 is a perspective view illustrating a stator disposed in the sensing device according to the first embodiment, FIG. 18 is an exploded perspective view illustrating the stator disposed in the sensing device according to the first embodiment, FIG. 19 is a lateral view illustrating a stator tooth disposed in the sensing device according to the first embodiment, and FIG. 20 is a view illustrating a bent protrusion part of the stator disposed in the sensing device according to the first embodiment.

Referring to FIG. 2 and FIGS. 17 to 20, the stator 400 may include the holder 410 connected to the output shaft, the body 420 disposed at the one side of the outer circumferential surface of the holder 410, and the pair of stator teeth 430 disposed on the body 420. Here, the stator tooth 430 may be fixed to the body 420. Also, the stator tooth 430 may be referred to as a "stator ring."

The holder 410 may be disposed to be connected to an output shaft of an electronic power steering system (EPS). Accordingly, the holder 410 rotates in association with rotation of the output shaft.

Here, the holder 410 may be formed of a metal material. However, the present invention is not necessarily limited thereto, and of course, another material may be used in consideration of a predetermined strength or more to allow the output shaft to be fitted and fixed.

The body 420 may be disposed at one side end portion of the holder 410. For example, the body 420 may be disposed at one side end portion of the holder 410 by using an insert injection method or the like using synthetic resin such as resin.

The body 420 may include a mold member 421 having a cylindrical shape, a flange portion 422 that protrudes from an outer circumferential surface of the mold member 421 in the radial direction, and an insertion hole 423 formed in the mold member 421. Here, the insertion hole 423 may be referred to as a "third through-hole" or "hole."

The flange portion 422 may be formed to protrude from the cylindrical mold member 421 outward in the circumferential direction (in the radial direction).

A pair of flange portions 422 may be disposed to be spaced apart vertically. As illustrated in FIG. 18, the pair of flange portions 422 may be disposed at an upper end and a lower end of the mold member 421 so as to protrude outward.

As illustrated in FIG. 18, a plurality of insertion holes 423 may be formed at predetermined intervals in the mold member 421 in the circumferential direction with respect to the center C.

Also, as teeth 432 of the stator teeth 430 are inserted into the insertion holes 423, the teeth 432 of the stator teeth 430 may be disposed at an inner surface of the body 420. As illustrated in FIG. 17, the teeth 432 of the stator teeth 430 may be disposed in an inner surface of the mold member 421.

The stator teeth 430 may be provided as the pair of stator teeth 430.

Each stator tooth 430 may include a stator tooth body 431, a plurality of teeth 432 disposed to be spaced apart along an inner circumferential surface of the stator tooth body 431, and protrusion parts 433 disposed to be spaced apart along an outer circumferential surface of the stator tooth body 431. Here, the teeth 432 and the protrusion parts 433 may be formed to protrude in the same direction. Also, the stator tooth body 431, the teeth 432, and the protrusion parts 433 may be integrally formed.

The stator tooth body 431 may be formed in a ring shape.

A bottom surface 431a of the stator tooth body 431 may be disposed to face the first housing 200. In FIG. 17, the bottom surface 431a may be one surface of the stator tooth body 431 that is formed on the stator tooth 430 disposed at a lower side with respect to the body 420. Alternatively, as illustrated in FIG. 18, the bottom surface 431a may be one surface of the stator tooth body 431 that is disposed at the holder 410 side with respect to the body 420.

The bottom surface 431a may be disposed to face the first surface 230 of the first housing 200 according to the first embodiment. Accordingly, the bottom surface 431a may come in contact with the first surface 230 formed with a curved surface.

Alternatively, the bottom surface 431a may be disposed to face the contact member 270 of the first housing 200A according to the second embodiment. Accordingly, the bottom surface 431a may come in contact with the curved surface 271 of the contact member 270.

Alternatively, the bottom surface 431a may be disposed to face the first protruding portion 233 and the second protruding portion 234 of the first housing 200B according to the third embodiment. Accordingly, the bottom surface 431a may come in contact with at least any one of the curved surface 233a of the first protruding portion 233 and the curved surface 234a of the second protruding portion 234.

Alternatively, the bottom surface 431a may be disposed to face the contact member 290 of the first housing 200C according to the fourth embodiment. Accordingly, the bottom surface 431a may come in contact with the upper surface 291 of the contact member 290.

The teeth 432 may be formed to protrude from the inner circumferential surface of the stator tooth body 431 in the axial direction.

As illustrated in FIG. 18, any one of the stator teeth 430 may be disposed at one side (upper portion) of the body 420, and the other one may be disposed at the other side (lower portion) of the body 420. Accordingly, as illustrated in FIG. 17, the teeth 432 of the stator teeth 430 may be disposed at predetermined intervals so as to be engaged with each other.

The protrusion parts 433 may be formed to protrude from the outer circumferential surface of the stator tooth body 431 in the axial direction.

The protrusion parts 433 may be fixed to an outer surface of the body 420 by caulking. Since the protrusion parts 433 are coupled to the outer surface of the body 420 using a caulking method in which one side of each protrusion part 433 is pressed and bent, assembly tolerance does not occur.

As illustrated in FIG. 20, the protrusion part 433 may be fixed to the flange portion 422 of the body 420 by caulking. Accordingly, a coupling force of the protrusion part 433 to the body 420 may be improved.

Meanwhile, the teeth 432 and the protrusion parts 433 may be disposed to be spaced apart from each other in the radial direction.

When viewed in the radial direction (y-direction), the protrusion parts 433 may be disposed between the teeth 432. Since a magnetic field is affected when the protrusion parts 433 are disposed to overlap the teeth 432 when viewed in the radial direction (y-direction), the protrusion parts 433 may be disposed between the teeth 432 to prevent an influence on the magnetic field.

The protrusion parts 433 may be provided as at least two first protrusions 433a disposed to be spaced apart from each other.

Referring to FIGS. 18 to 20, the protrusion parts 433 may implement a double caulking structure to further improve the coupling force of the protrusion part 433 to the body 420. Also, since the double caulking structure increases a contact area with the body 420, a caulking force in a rotational direction of the protrusion parts 433 may be improved.

As illustrated in FIG. 19, the two first protrusions 433a may be disposed to be spaced apart from each other at a preset separation distance d. Also, the first protrusion 433a may be formed in a quadrangular shape, and a height of the first protrusion 433a is smaller than a height of the tooth 432. Here, the separation distance d may be formed according to the following equation.

d:W=1:1.5

As illustrated in FIG. 19, a ratio of the separation distance d and a width W of the first protrusion 433a may be 1:1.5. That is, by placing the first protrusions 433a to be adjacent to each other while being spaced apart at the separation distance d, the caulking force in the rotational direction of the protrusion parts 433 may be improved. Further, since one region of the body 420 is disposed between the first protrusions 433a, a coupling force between the body 420 and the stator teeth 430 is improved.

FIG. 21 is a lateral view illustrating another embodiment of the stator tooth disposed in the sensing device according to the first embodiment. A stator tooth 430a according to another embodiment may be disposed in the body 420 in place of the above-described stator tooth 430.

Hereinafter, in describing the stator tooth 430a, elements which are the same as those of the stator tooth 430 will be denoted by the same reference numerals, and detailed description thereof will be omitted.

Referring to FIG. 21, the stator tooth 430a according to another embodiment may include a stator tooth body 431, a plurality of teeth 432, and protrusion parts 433 disposed to be spaced apart from each other along an outer circumferential surface of the stator tooth body 431. Here, the protrusion parts 433 may be provided as at least two second protrusions 433b disposed to be spaced apart from each other.

The second protrusion 433b may have one side surface formed to be inclined at a predetermined angle θ3.

As illustrated in FIG. 21, the one side surface of the second protrusion 433b may be formed to be inclined at the predetermined angle θ3 with respect to a virtual line L2 that passes through the center of the protrusion. Accordingly, since a contact area between the second protrusion 433b and the body 420 is increased, a caulking force in a rotational direction of the protrusion parts 433 may be improved.

As illustrated in FIG. 21, the second protrusion 433b may have a width that is narrow at the stator tooth body 431-side and that increases in a direction moving away from the stator tooth body 431. For example, the second protrusion 433b may be formed in trapezoidal shape. However, the present invention is not necessarily limited thereto, and of course, the second protrusion 433b may be formed in various other shapes in consideration of the contact area with the body 420.

Meanwhile, since the protrusion part 433 is fixed to an outer surface of the body 420 by caulking of the protrusion part 433, as illustrated in FIG. 20, a groove 422a may be formed in the flange portion 422 of the body 420. Here, the groove 422a is formed so that the number of grooves 422a corresponds to the number of protrusions 433a and 433b. Accordingly, catching step surfaces 422b formed due to the grooves 422a may be disposed to face each other.

Also, the protrusions 433a and 433b are pressed against the catching step surfaces 422b.

Therefore, the catching step surfaces 422b may support side surfaces of the protrusions 433a and 433b to improve a caulking force in the rotational direction. In particular, since the contact area between the second protrusion 433b and the catching step surface 422b is increased, the caulking force and support force in the rotational direction are further improved as compared to the first protrusion 433a.

A case in which the groove 422a is formed by caulking the protrusion part 433 has been described as an example, but the present invention is not necessarily limited thereto. For example, the groove 422a may be formed in the flange portion 422 first, and the shapes of the protrusions 433a and 433b may be matched to the shape of the groove 422a to fix the stator teeth 430 and 430a to the body 420. Here, end portions of the protrusions 433a and 433b may be bent to place the protrusions 433a and 433b in the groove 422a.

Accordingly, the protrusions 433a and 433b may be supported by the catching step surface 422b.

The rotor 500 is disposed inside the stator 400. Here, the rotor 500 is connected to an input shaft of a steering shaft. Accordingly, the rotor 500 may rotate in association with rotation of the input shaft.

The rotor 500 may include a cylindrical yoke 510 and a magnet 520 disposed on the yoke 510. The input shaft may be inserted into the yoke 510. Also, the magnet 520 may be disposed outside the yoke 510.

The magnet 520 may be adhered and fixed or press-fitted and fixed to an outer circumferential surface of the yoke 510.

The collector 600 collects a flux of the stator 400. Here, the collector 600 may be formed of a metal material, and two collectors 600 may be fixed inside the housing 100. Referring to FIG. 2, the collector 600 may be disposed inside each of the first housing 200 and the second housing 300.

The collector 600 may be disposed to be adjacent to the stator tooth 430. Here, being disposed to be adjacent may refer to being disposed to be spaced apart at a predetermined distance.

The collector 600 may include a plate 610 and a leg 620 that extends to protrude from the plate 610.

One surface of the plate 610 may be disposed on the second surface 240.

The leg 620 may extend from the plate 610 in the axial direction. Also, as illustrated in FIG. 2, an end portion of the leg 620 may be bent outward.

The sensing portion 700 measures a magnetic field generated between the stator 400 and the rotor 500. The sensing portion 700 is connected to an electronic control unit (ECU) of a motor, which assists steering force, to allow torque to be calculated on the basis of a change in the measured magnetic field.

The sensing portion 700 may include a circuit board 710 and a sensor 720. Here, the sensor 720 may be disposed at a position that corresponds to the end portion of the leg 620 of the collector 600.

The sensor 720 disposed on the circuit board 710 may detect a change in the magnetic field. A Hall integrated circuit (IC) may be provided as the sensor. Accordingly, the sensor 720 detects magnetization of the stator 400 that occurs due to an electrical interaction between the magnet 520 of the rotor 500 and the stator 400. Also, the sensing device 1 may measure torque on the basis of the detected magnetization.

The stator 400, the rotor 500, and the sensor 720 are components to measure torque. Due to a difference between rotation amounts of the input shaft and the output shaft, torsion may occur in a torsion bar of the input shaft and the output shaft. When the torsion occurs, the rotation amount of the magnet 520 of the rotor 500 and the rotation amount of the stator 400 become different. Therefore, since surfaces of the magnet 520 and the stator tooth 430 that oppose each other change, a change in magnetization occurs. Accordingly, the sensor 720 may detect the change in magnetization to measure torque acting on the steering shaft.

Second Embodiment

FIG. 22 is a view illustrating a sensing device according to a second embodiment.

Referring to FIG. 22, the sensing device according to the second embodiment may include a rotor 1100, a stator 1200, a sensing portion 1300, a shaft 1400, a housing 1500, a first gear 1600, and a second gear 1700.

The rotor 1100 is disposed inside the stator 1200. The rotor 1100 is connected to an input shaft of a steering shaft. Here, the input shaft may refer to a steering shaft connected to a steering handle of a vehicle. The rotor 1100 may include a cylindrical yoke 1110 and a first magnet 1120 disposed on the yoke 1110. The input shaft is inserted into the yoke 1110. Also, the first magnet 1120 may be disposed outside the yoke 1110. The first magnet 1120 may be adhered and fixed or press-fitted and fixed to an outer circumferential surface of the yoke 1110.

The stator 1200 is disposed outside the rotor 1100. The stator 1200 may include a ring-shaped stator tooth 1210 and a holder 1220. Two stator teeth 1210 may be fixed to an upper side and a lower side of the holder 1220, respectively. Each stator tooth 1210 may include a plurality of teeth 1211 disposed to face the first magnet 1120. The holder 1220 is coupled to the shaft 1400. The holder 1220 may be made of a plastic resin.

The sensing portion 1300 may include a circuit board 1310 and a collector 1320.

The circuit board 1310 includes a Hall sensor 1311. The Hall sensor 1311 detects magnetization of the stator 1200 that occurs due to an electrical interaction between the first magnet 1120 of the rotor 1100 and the stator 1200. The circuit board 1310 may be fastened to a separate sensor housing, a housing of an external device, or the like and fixed.

The collector 1320 collects a flux of the stator 1200. The collector 1320 may include an upper collector 1320A and a lower collector 1320B. The upper collector 1320A and the lower collector 1320B may be disposed to be spaced apart in the axial direction of the rotor 1100. Also, the Hall sensor 1311 is disposed between the upper collector 1320A and the lower collector 1320B in the axial direction of the rotor 1100.

The shaft 1400 is coupled to the holder 1220. The shaft 1400 may be connected to an output shaft of the steering shaft. Here, the output shaft may refer to a steering shaft connected to a wheel-side power transmission configuration. Therefore, the stator 1200 is connected to the output shaft and rotates together with the output shaft. The shaft 1400 may be made of a metal material.

The housing 1500 may include a first housing 1510, a second housing 1520, and a third housing 1530. The first housing 1510 may be disposed between the second housing 1520 and the third housing 1530 in the axial direction. The second gear 1700 may be disposed in the first housing 1510. The second gear 1700 is engaged with the first gear 1600. The first housing 1510 includes a first opening 1511. The shaft 1400 passes through the first opening 1511. The lower collector 1320B is disposed in the first housing 1510. The second housing 1520 is stacked on the first housing 1510. The second housing 1520 includes a second opening 1521. The shaft 1400 passes through the second opening 1521. The first opening 1511 and the second opening 1521 are aligned in the axial direction. The third housing 1530 is stacked on the second housing 1520. The third housing 1530 may include a third opening 1531. The rotor 1100 passes through the third opening 1531. The circuit board 1310 and the upper collector 1320A may be disposed in the third housing 1530.

The first gear 1600 is coupled to the shaft 1400. The first gear 1600 rotates together with the shaft 1400 when the stator 1200 rotates. The first gear 1600 is engaged with the second gear 1700. The second gear 1700 may be provided as a plurality of second gears 1700. All of the second gears 1700 may be engaged with the first gear 1600, or some of the plurality of second gears 1700 may be engaged with the first gear 1600 while the remaining second gears 1700 are disposed to be engaged with other second gears 1700. When the stator 1200 rotates, the first gear 1600 and the second gear 1700 rotate at a gear ratio. The second gear 1700 includes a second magnet 1710. When the second gear 1700 rotates, the second magnet 1710 rotates together. The Hall sensor 1311 detects a change in a magnetic flux due to rotation of the second magnet 1710.

FIG. 23 is a view illustrating a shaft, and FIG. 24 is a lateral cross-sectional view of the shaft.

Referring to FIGS. 23 and 24, the shaft 1400 includes a first part 1400A, a second part 1400B, and a third part 1400C. An outer diameter D1 of the first part 1400A may be larger than an outer diameter D2 of the second part 1400B. The first part 1400A is for coupling with the first gear 1600. Also, the first part 1400A is for coming in contact with the first opening 1511 of the first housing 1510. The third part 1400C connects the first part 1400A and the second part 1400B. The third part 1400C is disposed at a boundary between the first part 1400A and the second part 1400B. The third part 1400C may include an inclined surface.

The first part 1400A includes a first groove 1410 formed in an outer circumferential surface. The first groove 1410 is for coupling between the shaft 1400 and the first gear 1600. A first protrusion 1610 of the first gear 1600 is disposed in the first groove 1410. The first groove 1410 is formed to be concave on the outer circumferential surface of the first part 1400A. Here, an inlet of the first groove 1410 may be disposed at the third part 1400C.

The first groove 1410 may be provided as a plurality of first grooves 1410. The plurality of first grooves 1410 may be disposed at predetermined intervals in the outer circumferential surface of the first part 1400A in the circumferential direction of the shaft 1400. Also, the first part 1400A may include a protruding portion 1430. The protruding portion 1430 protrudes from an inner circumferential surface of the first part 1400A, corresponding to the first groove 1410. The protruding portion 1430 may be formed due to formation of the first groove 1410. For example, the protruding portion 1430 may be formed as the outer circumferential surface of the first part 1400A is pressed to form the first groove 1410.

The first part 1400A includes a second protrusion 1420. The second protrusion 1420 is disposed to extend from an upper end of the first part 1400A toward the outside of the first part 1400A. The second protrusion 1420 may be provided as a plurality of second protrusions 1420. The second protrusion 1420 may be for improving a coupling force between the shaft 1400 and the holder 1220. In particular, the second protrusion 1420 has an advantage of preventing slipping that occurs between the shaft 1400 and the holder 1220 in a rotational direction of the shaft 1400.

FIG. 25 is a view illustrating the shaft and a holder that are coupled, FIG. 26 is a plan view illustrating the holder, and FIG. 27 is an enlarged view of a coupling portion between the shaft and the holder.

Referring to FIGS. 25 to 27, the shaft 1400 and the holder 1220 may be integrally injection-molded. The holder 1220 includes a contact portion 1220A. The contact portion 1220A is disposed at one end of the holder 1220 to come in contact with the first part 1400A of the shaft 1400. The contact portion 1220A may include a ring-shaped body 1221 and a plurality of bridges 1222 that extend from the body 1221. The body 1221 may be disposed to be spaced apart from the holder 1220. The bridge 1222 connects the body 1221 and the holder 1220. The teeth 1211 of the stator teeth 1210 may be disposed between the bridges 1222.

Referring to FIG. 26, the body 1221 includes an overlapping region O disposed to overlap the first groove 1410 in the axial direction. The overlapping region O may be disposed in the axial direction of the first groove 1410. The overlapping region O blocks one side of the first groove 1410 to limit axial movement of the first gear 1600 disposed in the first groove 1410. Also, the overlapping region O determines an assembly position of the first gear 1600.

Referring to FIG. 27, the second protrusion 1420 is coupled to the body 1221 and the bridge 1222. The second protrusion 1420 may be disposed on the body 1221 and the bridge 1222. A second groove 1221a in which the second protrusion 1420 is disposed may be formed in the contact portion 1220A. The second groove 1221a may be disposed across the body 1221 and the bridge 1222. The shaft 1400 may include a third protrusion 1440. The third protrusion 1440 may be disposed at an upper end of the shaft 1400. The third protrusion 1440 may be provided as a plurality of third protrusions 1440. A third groove 1222a may be disposed in the body 1221. The third protrusion 1440 is disposed in the third groove 1222a. In particular, the third protrusion 1440 may be disposed at each of both sides of the first groove 1410. This is to reinforce weak coupling between the shaft 1400 and the holder 1220 due to a concave space of the first groove 1410.

The second protrusion 1420 and the third protrusion 1440 increase a contact area between the holder 1220 and the shaft 1400 to improve coupling between the holder 1220 and the shaft 1400 and prevent slipping between the holder 1220 and the shaft 1400 in the rotational direction.

FIG. 28 is a view illustrating a first gear coupled to the shaft.

Referring to FIG. 28, the first protrusion 1610 of the first gear 1600 is inserted into the first groove 1410 of the shaft 1400. In the axial direction, a length L3 of the first groove 1410 may be larger than a length L4 of the first protrusion 1610. The first gear 1600 may rotate while engaged with the second gear 1700 and move in the axial direction. The length L3 of the first groove 1410 is formed to be larger than the length L4 of the first protrusion 1610 to secure a movement space for the first gear 1600 in the axial direction.

FIG. 29 is a view illustrating a protruding portion of the shaft 1400.

Referring to FIG. 29, the protruding portion 1430 is disposed on an inner circumferential surface of the shaft 1400. As illustrated in FIG. 29A, the protruding portion 1430 may be disposed in a fourth groove 1222b of the body 1221. The protruding portion 1430 may increase the contact area between the holder 1220 and the shaft 1400 to improve coupling between the holder 1220 and the shaft 1400 and prevent slipping between the holder 1220 and the shaft 1400 in the rotational direction.

FIG. 30 is a lateral cross-sectional view of the sensing device.

Referring to FIG. 30, the first housing 1510 may be disposed at an upper side of the second housing 1520.

The first housing 1510 includes the first opening 1511. The second housing 1520 includes the second opening 1521. The shaft 1400 passes through the first opening 1511 and the second opening 1521. A diameter D4, which is an inner diameter of the second opening 1521, may be smaller than a diameter D3, which is an inner diameter of the first opening 1511. Also, the outer diameter D1 of the first part 1400A may be smaller than the diameter D3 of the first opening 1511 and larger than the diameter D4 of the second opening 1521. The outer diameter D2 of the second part 1400B may be smaller than the diameter D4 of the second opening 1521.

An inner circumferential surface of the first opening 1511 is a sliding surface S1 for the first part 1400A. The first gear 1600 is directly coupled to the first part 1400A. The outer circumferential surface of the first part 1400A is disposed to be adjacent to the inner circumferential surface of the first opening 1511. As the shaft 1400 rotates, the outer circumferential surface of the first part 1400A may come in contact with the inner circumferential surface of the first opening 1511.

In a case in which the first gear 1600 is attached to the shaft 1400 through a component made of plastic that is attached to the shaft 1400, the corresponding component made of plastic and the inner circumferential surface of the first opening 1511 that is made of plastic slide against each other, causing a loud noise to occur. In the case of the motor according to an embodiment, the first gear 1600 is directly coupled to the shaft 1400. Also, since the shaft 1400 is made of metal and the inner circumferential surface of the first opening 1511 is made of plastic, and thus the component made of plastic and the inner circumferential surface of the first opening 1511 that is made of plastic slide against each other, the noise may be significantly reduced.

Meanwhile, an outer circumferential surface of the second part 1400B is a sliding surface for an inner circumferential surface of the second opening 1521. The outer diameter D2 of the second part 1400B is smaller than the diameter D4 of the second opening 1521. Also, the outer circumferential surface of the second part 1400B is disposed to be adjacent to the inner circumferential surface of the second opening 1521. Also, the second housing 1520 may include an inclined surface 1521a. The third part 1400C, which is disposed to be inclined, may come in contact with the inclined surface 1521a of the second housing 1520. That is, the inner circumferential surface of the second opening 1521 may include the inclined surface 1521a coming in contact with the third part 1400C. This is due to the structure in which the outer diameter of the first part is formed to be larger than the outer diameter of the second part, and the inclined surface 1521a induces stable rotation of the shaft 1400. Accordingly, the inclined surface 1521a is a sliding surface S2 for the third part 1400C disposed to be inclined.

The present invention has been described above on the basis of embodiments thereof, but those of ordinary skill in the art should understand that various modifications and changes may be made to the present invention within the scope not departing from the idea and area of the present invention stated in the claims below. Also, differences relating to the modifications and changes should be interpreted as falling within the scope of the present invention defined by the attached claims.

DESCRIPTION OF REFERENCE NUMERALS

1: sensing device, 100: housing, 200: first housing, 210: first housing body, 230: first surface, 240: second surface, 270, 290: contact member, 300: second housing, 400, 1200: stator, 410: holder, 420: body, 430: stator tooth, 431: stator tooth body, 431a: bottom surface, 432: tooth, 433: protrusion part, 500, 1100: rotor, 600: collector, 700, 1300: sensing portion, 1400: shaft, 1400A: first part, 1400B: second part, 1400C: third part

The invention claimed is:

1. A sensing device comprising:
a housing;
a stator disposed in the housing; and
a rotor disposed in the stator,
wherein the stator includes a body and a stator tooth coupled to the body,
wherein the housing includes a first surface that corresponds to a bottom surface of the stator tooth, and
wherein the first surface includes a curved surface that protrudes toward the stator tooth.

2. The sensing device of claim 1, wherein the protruding curved surface of the first surface includes a non-magnetic metal.

3. The sensing device of claim 1, wherein:
the housing includes a contact member disposed on the curved surface; and
the contact member includes a curved surface that protrudes toward the bottom surface of the stator tooth.

4. The sensing device of claim 3, wherein the contact member protrudes to be higher than the first surface.

5. The sensing device of claim 4, wherein:
the curved surface of the first surface is formed with a first curvature;
the curved surface of the contact member is formed with a second curvature; and
the second curvature is larger than the first curvature.

6. The sensing device of claim 1, wherein:
the first surface includes a first protruding portion and a second protruding portion; and
the first protruding portion and the second protruding portion each include a curved surface.

7. The sensing device of claim 6, wherein:
since the first protruding portion and the second protruding portion are disposed to be spaced apart in a radial direction, a groove is formed between the first protruding portion and the second protruding portion; and
based on a sum of a width of the first protruding portion, a width of the groove, and a width of the second protruding portion, the width of the groove is 20% to 30% of the sum.

8. The sensing device of claim 1, wherein the stator includes:
a holder;
the body disposed at one side of an outer circumferential surface of the holder; and
a pair of stator teeth disposed on the body,
wherein each of the pair of stator teeth includes a stator tooth body, teeth that protrude from an inner circumferential surface of the stator tooth body in an axial direction, and protrusion parts that protrude from an outer circumferential surface of the stator tooth body in the axial direction.

9. The sensing device of claim 8, wherein, when viewed in a radial direction, the protrusion parts are disposed between the teeth, and the protrusion parts are provided as at least two protrusions that are disposed to be spaced apart from each other.

10. The sensing device of claim 9, wherein:
the body includes a mold member and a flange portion that protrudes from an outer circumferential surface of the mold member in the radial direction; and
the protrusion parts are fixed to the flange portion by caulking.

11. The sensing device of claim 1, wherein:
a shaft coupled to the stator; and
a first gear disposed outside the shaft,
wherein the housing includes a first opening and a second opening that are disposed to be spaced apart in an axial direction, wherein the shaft includes a first part and a second part that have different diameters,
wherein the first part comes in contact with the first gear,
wherein an outer diameter of the first part is smaller than a diameter of the first opening and larger than a diameter of the second opening, and
wherein an outer diameter of the second part is smaller than the diameter of the second opening.

12. The sensing device of claim 11, wherein:
the first gear includes a first protrusion disposed on an inner circumferential surface of the first gear;
the shaft includes a first groove; and
the first protrusion is disposed in the first groove.

13. The sensing device of claim 12, wherein:
the shaft includes a third part disposed at a boundary between the first part and the second part; and
an inlet of the first groove is disposed at the third part.

14. The sensing device of claim 13, wherein the third part is disposed to be inclined.

15. The sensing device of claim 14, wherein an inner circumferential surface of the second opening includes an inclined surface that comes in contact with the third part.

16. The sensing device of claim 12, wherein:
the shaft includes a second protrusion; and
a holder of the stator includes a second groove in which the second protrusion is disposed.

17. The sensing device of claim 12, wherein, in the axial direction, at least a portion of the holder of the stator overlaps the first groove.

18. A sensing device comprising:
a housing;
a stator disposed in the housing; and
a rotor disposed in the stator,
wherein the stator includes a body and a stator tooth coupled to the body,
wherein the housing includes a contact member that comes in contact with a bottom surface of the stator tooth,
wherein the contact member is formed of a non-magnetic metal, and
wherein the contact member includes a curved surface that protrudes toward the bottom surface of the stator tooth.

19. The sensing device of claim 18, wherein the contact member is formed in an arc shape in a circumferential direction.

20. A sensing device comprising:
a housing;
a stator disposed in the housing;
a rotor disposed in the stator;
a sensing portion configured to measure a magnetic field generated between the rotor and the stator;
a shaft coupled to the stator; and
a first gear disposed outside the shaft,
wherein the shaft is disposed in an opening of the housing,
wherein the shaft comes in contact with the first gear,
wherein a portion of an outer circumferential surface of the shaft comes in contact with an inner circumferential surface of the opening of the housing,
wherein the shaft includes a first groove formed in an outer circumferential surface,
wherein the first gear includes a first protrusion disposed on an inner circumferential surface, and
wherein the first protrusion is disposed in the first groove.

* * * * *